(12) United States Patent
Yoshitsugu

(10) Patent No.: US 8,462,442 B2
(45) Date of Patent: *Jun. 11, 2013

(54) ZOOM LENS SYSTEM, IMAGING DEVICE AND CAMERA

(75) Inventor: Keiki Yoshitsugu, Hyogo (JP)

(73) Assignee: Panasonic Corporation, Kadoma-shi (JP)

(*) Notice: Subject to any disclaimer, the term of this patent is extended or adjusted under 35 U.S.C. 154(b) by 231 days.

This patent is subject to a terminal disclaimer.

(21) Appl. No.: 13/062,951

(22) PCT Filed: Sep. 10, 2009

(86) PCT No.: PCT/JP2009/004473
§ 371 (c)(1),
(2), (4) Date: Mar. 9, 2011

(87) PCT Pub. No.: WO2010/029738
PCT Pub. Date: Mar. 18, 2010

(65) Prior Publication Data
US 2011/0194017 A1    Aug. 11, 2011

(30) Foreign Application Priority Data
Sep. 11, 2008  (JP) ................. 2008-233923

(51) Int. Cl.
*G02B 15/14* (2006.01)
*H04N 5/262* (2006.01)

(52) U.S. Cl.
USPC ............ 359/686; 359/687; 348/240.99

(58) Field of Classification Search
USPC ............ 348/335, 240.99; 359/686–690, 359/715–716, 740, 774, 784–786
See application file for complete search history.

(56) References Cited

U.S. PATENT DOCUMENTS

| | | | |
|---|---|---|---|
| 2007/0223106 A1* | 9/2007 | Kamo et al. | 359/687 |
| 2007/0223107 A1* | 9/2007 | Noguchi et al. | 359/687 |
| 2008/0112062 A1* | 5/2008 | Miyajima | 359/687 |
| 2008/0310032 A1* | 12/2008 | Itoh | 359/687 |

FOREIGN PATENT DOCUMENTS

| | | |
|---|---|---|
| JP | 2001-356268 A | 12/2001 |
| JP | 2004-093649 A | 3/2004 |
| JP | 2007-171371 A | 7/2007 |
| JP | 2007-240747 A | 9/2007 |
| JP | 2007-256452 A | 10/2007 |
| JP | 2007-286233 A | 11/2007 |
| JP | 2007-328178 A | 12/2007 |
| JP | 2008-052110 A | 3/2008 |
| JP | 2008-052113 A | 3/2008 |
| JP | 2008-052116 A | 3/2008 |

(Continued)

*Primary Examiner* — Kelly L Jerabek

(74) *Attorney, Agent, or Firm* — Judge Patent Associates

(57) ABSTRACT

A high-performance zoom lens system which is compact and has a wide view angle at a wide-angle limit and a high zooming ratio in a balanced manner, in order from an object side to an image side, comprising a first lens unit having positive optical power, a second lens unit having negative optical power, a third lens unit having positive optical power, and a fourth lens unit having positive optical power, wherein the first lens unit is composed of at most two lens elements, the second lens unit is composed of two lens elements, the third lens unit is composed of three lens elements, and the condition: nd>1.75 (nd: a refractive index to the d-line of each lens element constituting the zoom lens system) is satisfied; an imaging device; and a camera are provided.

13 Claims, 25 Drawing Sheets

FOREIGN PATENT DOCUMENTS

| | | |
|---|---|---|
| JP | 2008-122879 A | 5/2008 |
| JP | 2008-122880 A | 5/2008 |
| JP | 2008-146016 A | 6/2008 |
| JP | 2008-172321 A | 7/2008 |

* cited by examiner

ZOOM LENS SYSTEM, IMAGING DEVICE AND CAMERA

TECHNICAL FIELD

The present invention relates to a zoom lens system, an imaging device and a camera. In particular, the present invention relates to: a high-performance zoom lens system which is compact and has a wide view angle at a wide-angle limit and a high zooming ratio in a balanced manner; an imaging device employing the zoom lens system; and a thin and compact camera employing the imaging device.

BACKGROUND ART

There are extremely strong demands for size reduction and performance improvement in digital still cameras and digital video cameras (simply referred to as digital cameras, hereinafter) having an image sensor for performing photoelectric conversion. In particular, from a convenience point of view, digital cameras are strongly requested that employ a zoom lens system having a high zooming ratio and still covering a wide focal-length range from a wide angle condition to a highly telephoto condition. On the other hand, in recent years, zoom lens systems are also desired that have a wide angle range where the photographing field is large.

As zoom lens systems having a high zooming ratio and zoom lens systems having a wide angle range as described above, various kinds of zoom lenses having a four-unit construction of positive, negative, positive and positive have conventionally been proposed, which each comprises, in order from the object side to the image side, a first lens unit having positive optical power, a second lens unit having negative optical power, a third lens unit having positive optical power, and a fourth lens unit having positive optical power.

Japanese Laid-Open Patent Publication No. 2008-146016 discloses a zoom lens having the above-mentioned four-unit construction of positive, negative, positive and positive, in which at the time of magnification change from a wide-angle limit to a telephoto limit, at least a first lens unit, a second lens unit, and a third lens unit are moved and thereby the intervals between the respective lens units are changed, the second lens unit is composed of at most three lenses, and the relation between the ratio of the values of lateral magnification of the second lens unit at a telephoto limit and a wide-angle limit and the ratio of the values of lateral magnification of the third lens unit at a telephoto limit and a wide-angle limit is set forth.

Japanese Laid-Open Patent Publication No. 2008-122880 discloses a zoom lens having the above-mentioned four-unit construction of positive, negative, positive and positive, and having a zooming ratio of 3 to 12, in which a second lens unit is composed of at most three lenses, a bi-concave negative lens is arranged on the most object side in the second lens unit, and the shape factor of the bi-concave negative lens is set forth.

Japanese Laid-Open Patent Publication No. 2008-122879 discloses a zoom lens having the above-mentioned four-unit construction of positive, negative, positive and positive, in which a first lens unit is composed of a negative lens and a positive lens, and the shape factor of the positive lens is set forth.

Japanese Laid-Open Patent Publication No. 2008-052116 discloses a zoom lens having the above-mentioned four-unit construction of positive, negative, positive and positive, in which a first lens unit is composed of a positive lens and a negative lens, a second lens unit is composed of, in order from the object side, a negative lens and a positive lens, and a refractive index and an Abbe number of the negative lens in the second lens unit are set forth.

Japanese Laid-Open Patent Publication No. 2008-052113 discloses a zoom lens having the above-mentioned four-unit construction of positive, negative, positive and positive, and having a zooming ratio of 3.8 to 10, in which a second lens unit includes a bi-concave negative lens on the most object side, the entire second lens unit is composed of at most two negative lenses and a positive lens, and the shape factor of the bi-concave negative lens is set forth.

Japanese Laid-Open Patent Publication No. 2008-052110 discloses a zoom lens having the above-mentioned four-unit construction of positive, negative, positive and positive, in which a second lens unit is composed of, in order from the object side, a negative lens and a positive lens, and a refractive index and an Abbe number of the positive lens are set forth.

Japanese Laid-Open Patent Publication No. 2007-328178 discloses a zoom lens having the above-mentioned four-unit construction of positive, negative, positive and positive, in which a first lens unit is composed of, in order from the object side, a negative lens and a positive lens, a second lens unit is composed of, in order from the object side, a negative lens and a positive lens, a third lens unit is composed of at most three lenses including a positive lens and a negative lens, and a fourth lens unit is composed of a positive lens.

Japanese Laid-Open Patent Publication No. 2007-256452 discloses a zoom lens having the above-mentioned four-unit construction of positive, negative, positive and positive, in which a third lens unit is composed of, in order from the object side, a first positive lens, a second bi-concave negative lens, and a third negative lens, and at the time of magnification change, the interval between a first lens unit and a second lens unit is greater and the interval between the second lens unit and the third lens unit is smaller at a telephoto limit than at a wide-angle limit.

Japanese Laid-Open Patent Publication No. 2007-240747 discloses a zoom lens having the above-mentioned four-unit construction of positive, negative, positive and positive, in which a first lens unit is composed of, in order from the object side, two lenses, i.e., a negative lens and a positive lens; a second lens unit is composed of, in order from the object side, two lenses, i.e., a negative lens and a positive lens; a third lens unit is composed of, in order from the object side, three lenses, i.e., a positive lens, a positive lens, and a negative lens; a fourth lens unit is composed of a positive lens; at the time of magnification change, the interval between the first lens unit and the second lens unit is greater at a telephoto limit than at a wide-angle limit, and the third lens unit is located closer to the object side so that the interval between the third lens unit and the second lens unit decreases; a brightness diaphragm, which moves in the direction along the optical axis at the time of magnification change, is arranged between the second lens unit and the third lens unit; and the brightness diaphragm is located closer to the object side at a telephoto limit than at a wide-angle limit.

Japanese Laid-Open Patent Publication No. 2007-171371 discloses a zoom lens having the above-mentioned four-unit construction of positive, negative, positive and positive, in which a first lens unit is located closer to the object side at a telephoto limit than at a wide-angle limit; the interval between the first lens unit and a second lens unit is greater, the interval between the second lens unit and a third lens unit is smaller, and the interval between the third lens unit and a fourth lens unit is greater at a telephoto limit than at a wide-angle limit; the first lens unit is composed of a negative lens and a positive lens; the second lens unit is composed of, in order from the object side to the image side, a negative lens and a positive lens; and the ratio between the focal length of the negative lens in the second lens unit or the focal length of the second lens unit, and the focal length of the entire lens system at a wide-angle limit is set forth.

Japanese Laid-Open Patent Publication No. 2008-172321 discloses an imaging device comprising: a zoom lens which includes the above-mentioned four-unit construction of positive, negative, positive and positive, and performs zooming from a wide-angle limit to a telephoto limit with the intervals between a plurality of lens units being varied; an image sensor; and an image recovery unit, in which the relations among the maximum length of the zoom lens along the optical axis from its most-object-side refractive surface to its imaging surface, the focal lengths of the entire system at a wide-angle limit and a telephoto limit, the minimum F-number at a telephoto limit, and the half of the diagonal length of an effective imaging range on the imaging surface, are set forth.

CITATION LIST

Patent Literature

[PTL 1] Japanese Laid-Open Patent Publication No. 2008-146016
[PTL 2] Japanese Laid-Open Patent Publication No. 2008-122880
[PTL 3] Japanese Laid-Open Patent Publication No. 2008-122879
[PTL 4] Japanese Laid-Open Patent Publication No. 2008-052116
[PTL 5] Japanese Laid-Open Patent Publication No. 2008-052113
[PTL 6] Japanese Laid-Open Patent Publication No. 2008-052110
[PTL 7] Japanese Laid-Open Patent Publication No. 2007-328178
[PTL 8] Japanese Laid-Open Patent Publication No. 2007-256452
[PTL 9] Japanese Laid-Open Patent Publication No. 2007-240747
[PTL 10] Japanese Laid-Open Patent Publication No. 2007-171371
[PTL 11] Japanese Laid-Open Patent Publication No. 2008-172321

SUMMARY OF THE INVENTION

Problems to be Solved by the Invention

Each of the zoom lenses disclosed in the respective patent literatures is miniaturized to such an extent that it can be applied to a thin and compact digital camera, but cannot meet the recent demands in terms of achieving a good balance between the view angle at a wide-angle limit and the zooming ratio.

The object of the present invention is to provide: a high-performance zoom lens system which is compact and has a wide view angle at a wide-angle limit and a high zooming ratio in a balanced manner; an imaging device employing the zoom lens system; and a thin and compact camera employing the imaging device.

Solution to the Problems

One of the above-described objects is achieved by the following zoom lens system. That is, the present invention relates to:

a zoom lens system, in order from an object side to an image side, comprising a first lens unit having positive optical power, a second lens unit having negative optical power, a third lens unit having positive optical power, and a fourth lens unit having positive optical power, wherein
the first lens unit is composed of at most two lens elements,
the second lens unit is composed of two lens elements,
the third lens unit is composed of three lens elements, and
the following condition (1) is satisfied:

$$nd > 1.75 \quad (1)$$

where,
nd is a refractive index to the d-line of each lens element constituting the zoom lens system.

One of the above-described objects is achieved by the following imaging device. That is, the present invention relates to:

an imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system, in order from an object side to an image side, comprises a first lens unit having positive optical power, a second lens unit having negative optical power, a third lens unit having positive optical power, and a fourth lens unit having positive optical power, wherein
the first lens unit is composed of at most two lens elements,
the second lens unit is composed of two lens elements,
the third lens unit is composed of three lens elements, and
the following condition (1) is satisfied:

$$nd > 1.75 \quad (1)$$

where,
nd is a refractive index to the d-line of each lens element constituting the zoom lens system.

One of the above-described objects is achieved by the following camera. That is, the present invention relates to:
a camera for converting an optical image of an object into an electric image signal and then performing at least one of displaying and storing of the converted image signal, comprising:
an imaging device including a zoom lens system that forms the optical image of the object and an image sensor that converts the optical image formed by the zoom lens system into the electric image signal, wherein
the zoom lens system, in order from an object side to an image side, comprises a first lens unit having positive optical power, a second lens unit having negative optical power, a third lens unit having positive optical power, and a fourth lens unit having positive optical power, wherein
the first lens unit is composed of at most two lens elements,
the second lens unit is composed of two lens elements,
the third lens unit is composed of three lens elements, and
the following condition (1) is satisfied:

$$nd > 1.75 \quad (1)$$

where,
nd is a refractive index to the d-line of each lens element constituting the zoom lens system.

Effects of the Invention

According to the present invention, it is possible to provide: a high-performance zoom lens system which is compact and has a wide view angle at a wide-angle limit and a high zooming ratio in a balanced manner; an imaging device employing the zoom lens system; and a thin and compact camera employing the imaging device.

EMBODIMENTS OF THE INVENTION

Embodiments 1 to 9

Figure 1:
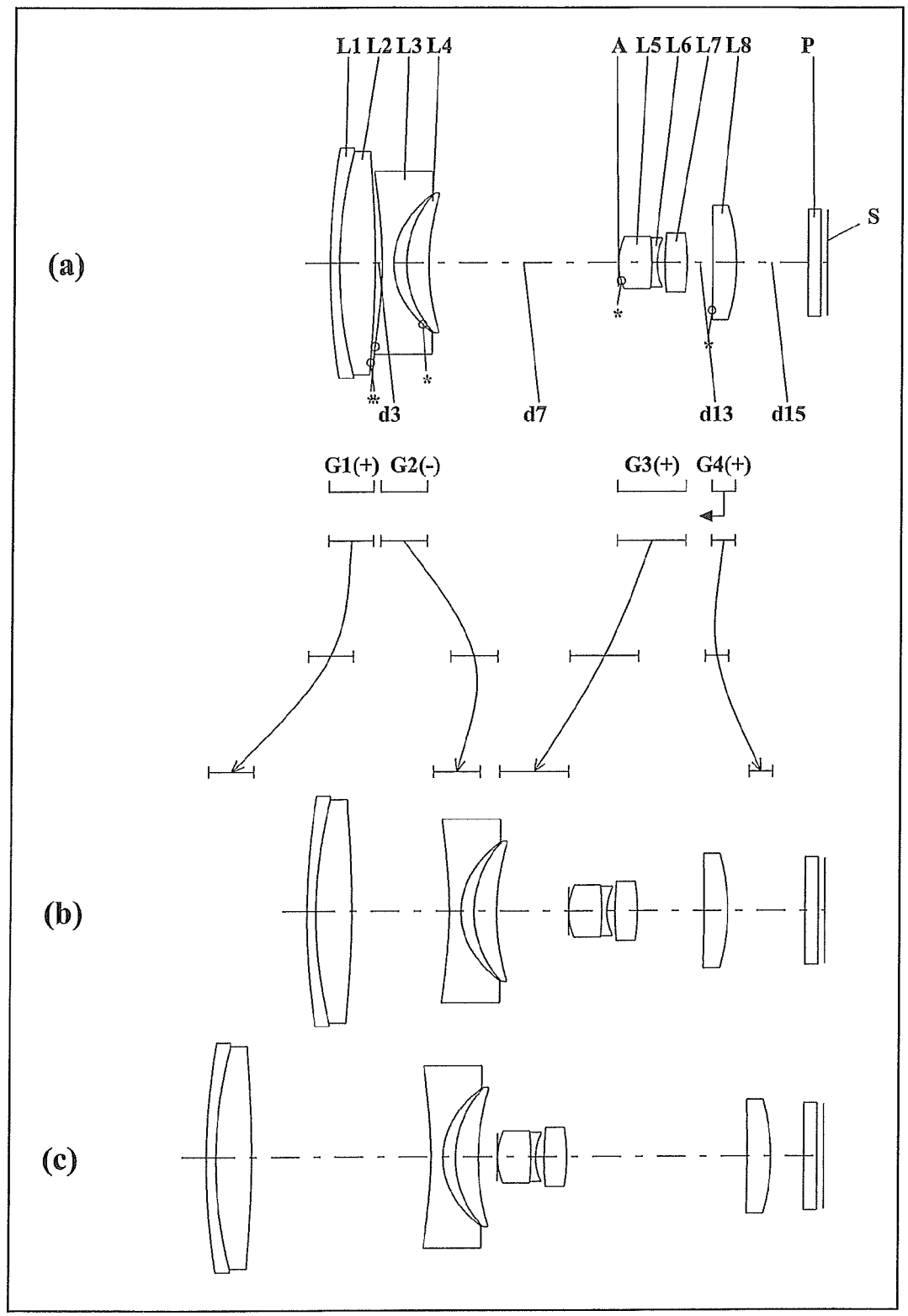
FIG. 1 is a lens arrangement diagram showing an infinity in-focus condition of a zoom lens system according to Embodiment 1 (Example 1).
Figure 2:
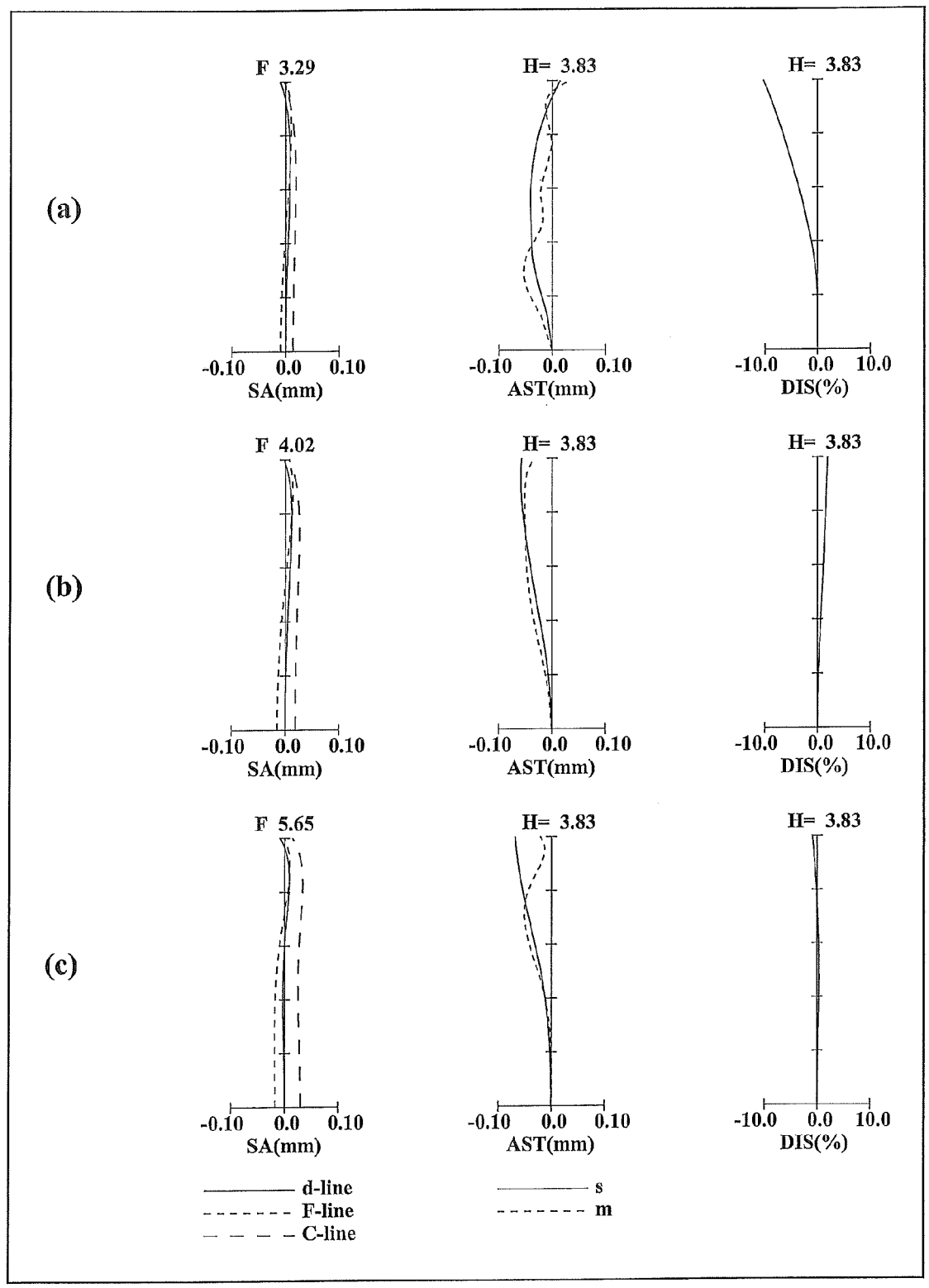
FIG. 2 is a longitudinal aberration diagram of an infinity in-focus condition of a zoom lens system according to Example 1.

FIGS. 1, 3, 6, 9, 12, 15, 18, 20 and 23 are lens arrangement diagrams of zoom lens systems according to Embodiments 1 to 9, respectively.

Each of FIGS. 1, 3, 6, 9, 12, 15, 18, 20 and 23 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit having positive optical power. Then, in zooming, the individual lens units move in a direction along the optical axis such that intervals between the lens units, that is, the interval between the first lens unit and the second lens unit, the interval between the second lens unit and the third lens unit, and the interval between the third lens unit and the fourth lens unit should all vary. In the zoom lens system according to each embodiment, since these lens units are arranged in the desired optical power configuration, high optical performance is maintained and still size reduction is achieved in the entire lens system.

Further, in FIGS. 1, 3, 6, 9, 12, 15, 18, 20 and 23, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P equivalent to an optical low-pass filter or a face plate of an image sensor is provided.

Further, in FIGS. 1, 3, 6, 9, 12, 15, 18, 20 and 23, an aperture diaphragm A is provided on the most object side in the third lens unit G3. In zooming from a wide-angle limit to a telephoto limit at the time of image taking, the aperture diaphragm A moves along the optical axis integrally with the third lens unit G3.

As shown in FIG. 1, in the zoom lens system according to Embodiment 1, the first lens unit G1, in order from the object side to the image side, comprises a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment 1, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 1, the third lens unit G3, in order from the object side to the image side, comprises a bi-convex fifth lens element L5; a bi-concave sixth lens element L6; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 1, the fourth lens unit G4 comprises solely a positive meniscus eighth lens element L8 with the convex surface facing the image side. The eighth lens element L8 has an aspheric object side surface.

In the zoom lens system according to Embodiment 1, a plane parallel plate P is provided on the object side relative to the image surface S (between the image surface S and the eighth lens element L8).

In the zoom lens system according to Embodiment 1, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 3:
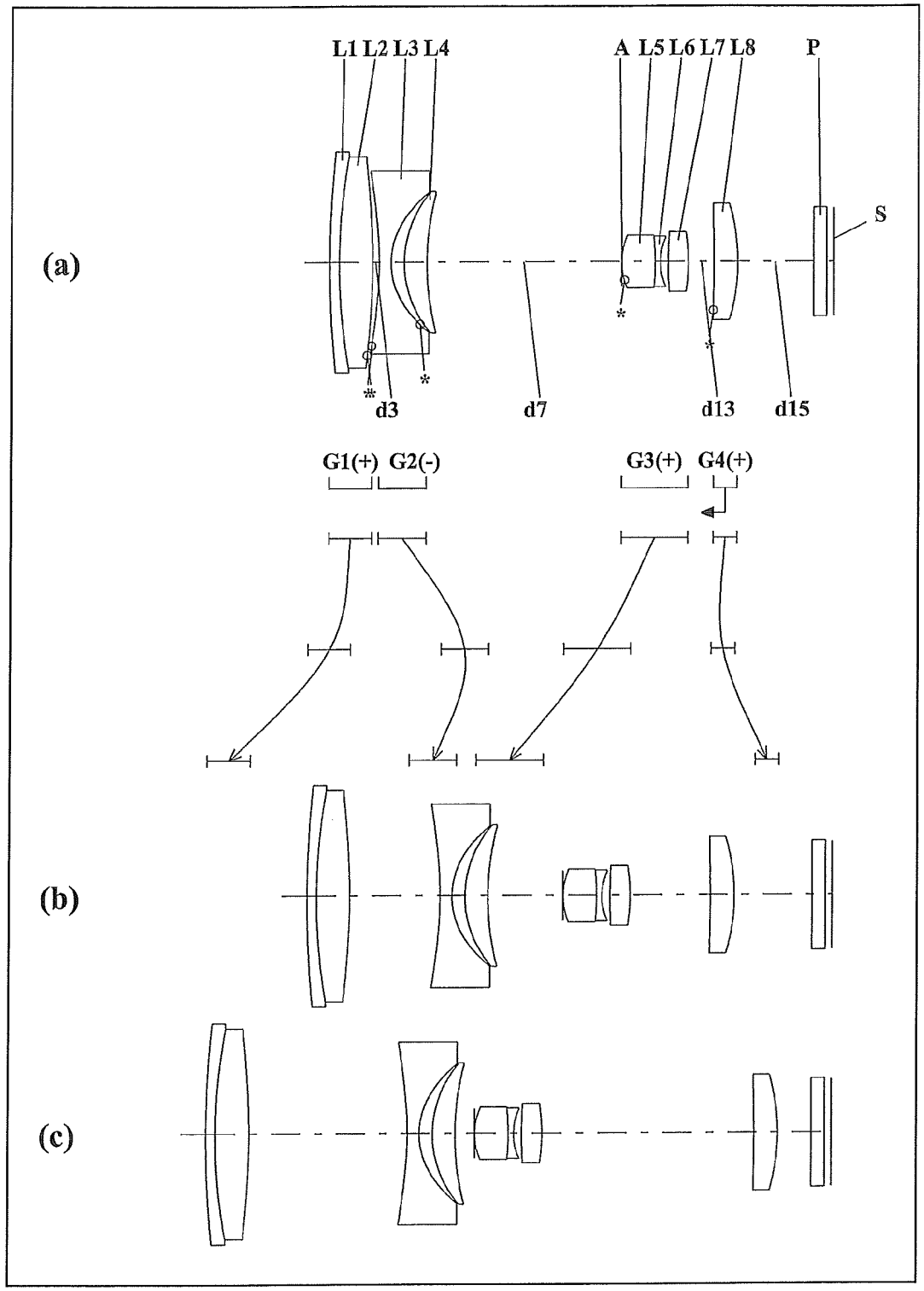
FIG. 3 is a lens arrangement diagram showing an infinity in-focus condition of a zoom lens system according to Embodiment 2 (Example 2).
Figure 4:
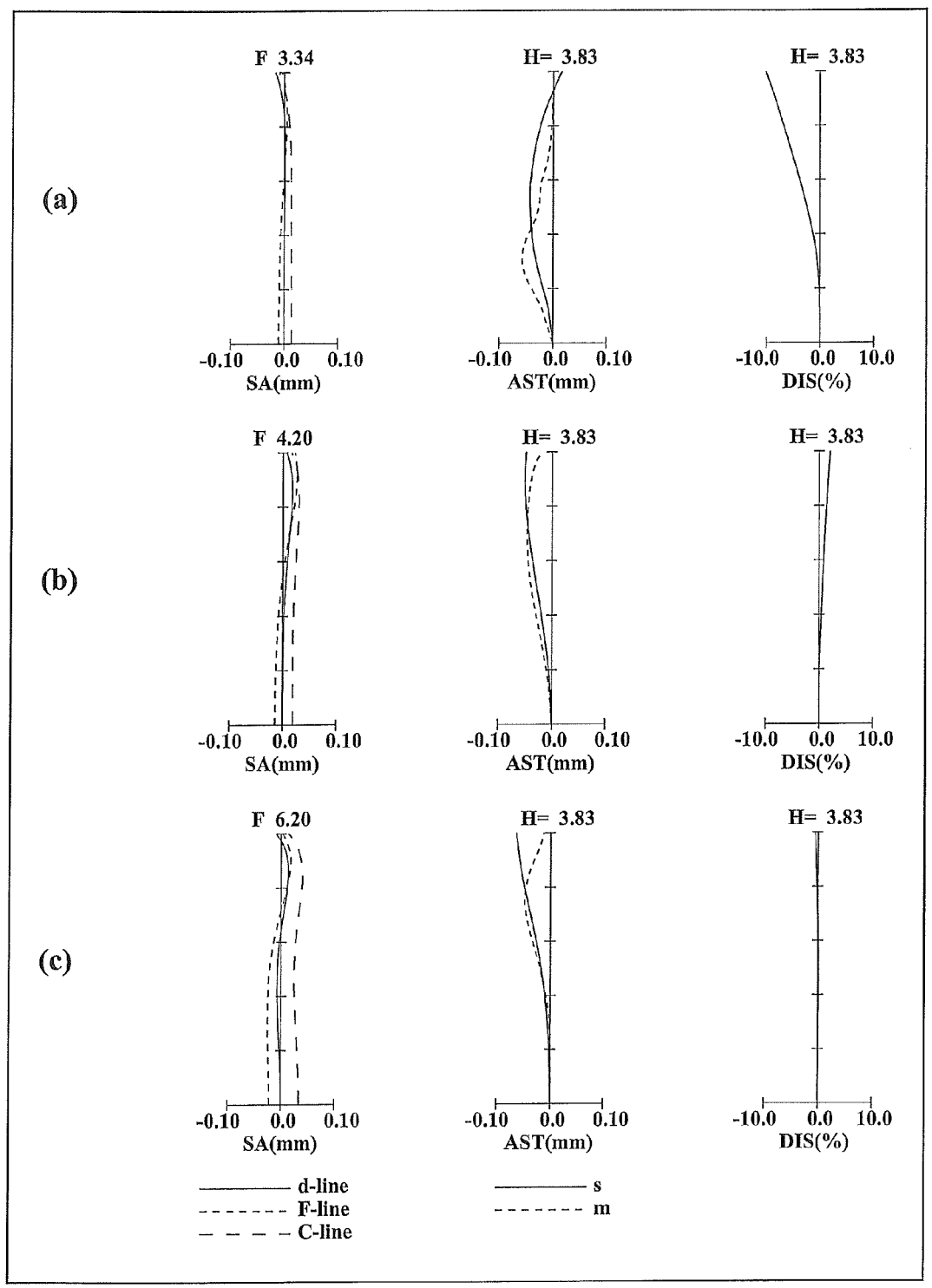
FIG. 4 is a longitudinal aberration diagram of an infinity in-focus condition of a zoom lens system according to Example 2.
Figure 5:
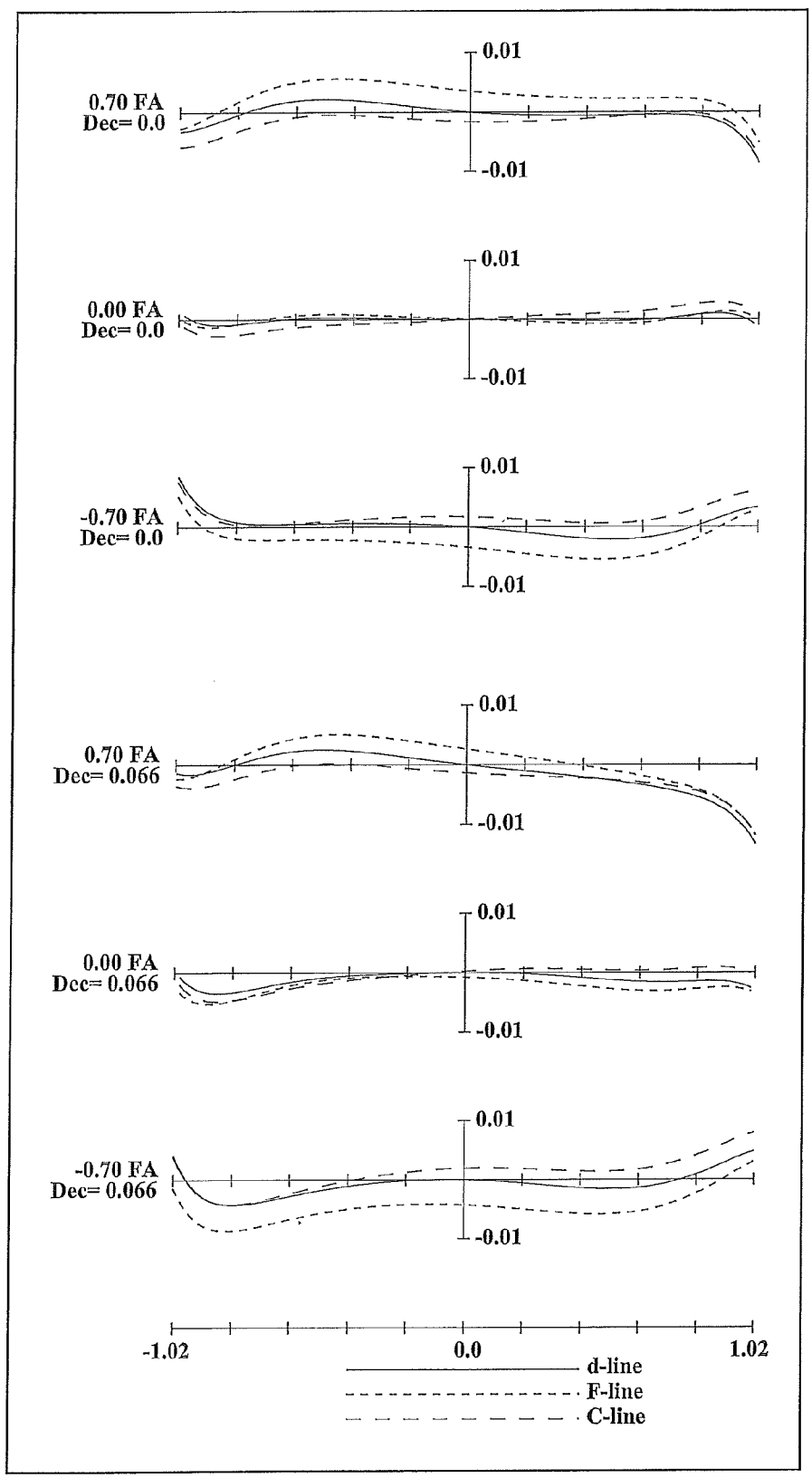
FIG. 5 is a lateral aberration diagram of a zoom lens system according to Example 2 at a telephoto limit in a basic state where image blur compensation is not performed and in a blur compensation state.

As shown in FIG. 3, in the zoom lens system according to Embodiment 2, the first lens unit G1, in order from the object side to the image side, comprises a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment 2, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 2, the third lens unit G3, in order from the object side to the image side, comprises a bi-convex fifth lens element L5; a bi-concave sixth lens element L6; and a bi-convex seventh lens element L7. Among these, the fifth lens element L5 and the sixth lens element L6 are cemented with each other. The fifth lens element L5 has an aspheric object side surface.

In the zoom lens system according to Embodiment 2, the fourth lens unit G4 comprises solely a positive meniscus eighth lens element L8 with the convex surface facing the image side. The eighth lens element L8 has an aspheric object side surface.

In the zoom lens system according to Embodiment 2, a plane parallel plate P is provided on the object side relative to the image surface S (between the image surface S and the eighth lens element L8).

In the zoom lens system according to Embodiment 2, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 6:
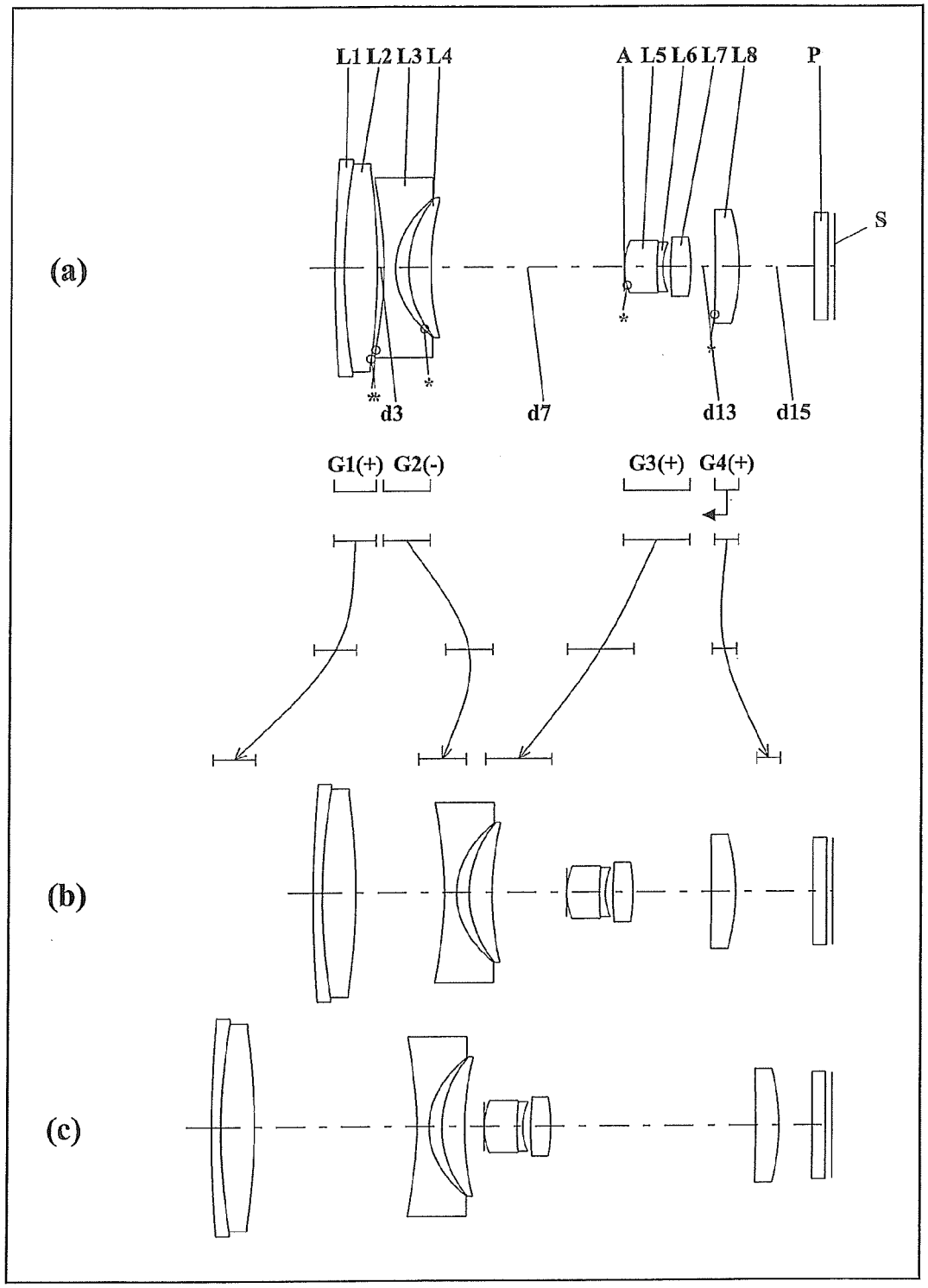
FIG. 6 is a lens arrangement diagram showing an infinity in-focus condition of a zoom lens system according to Embodiment 3 (Example 3).
Figure 7:
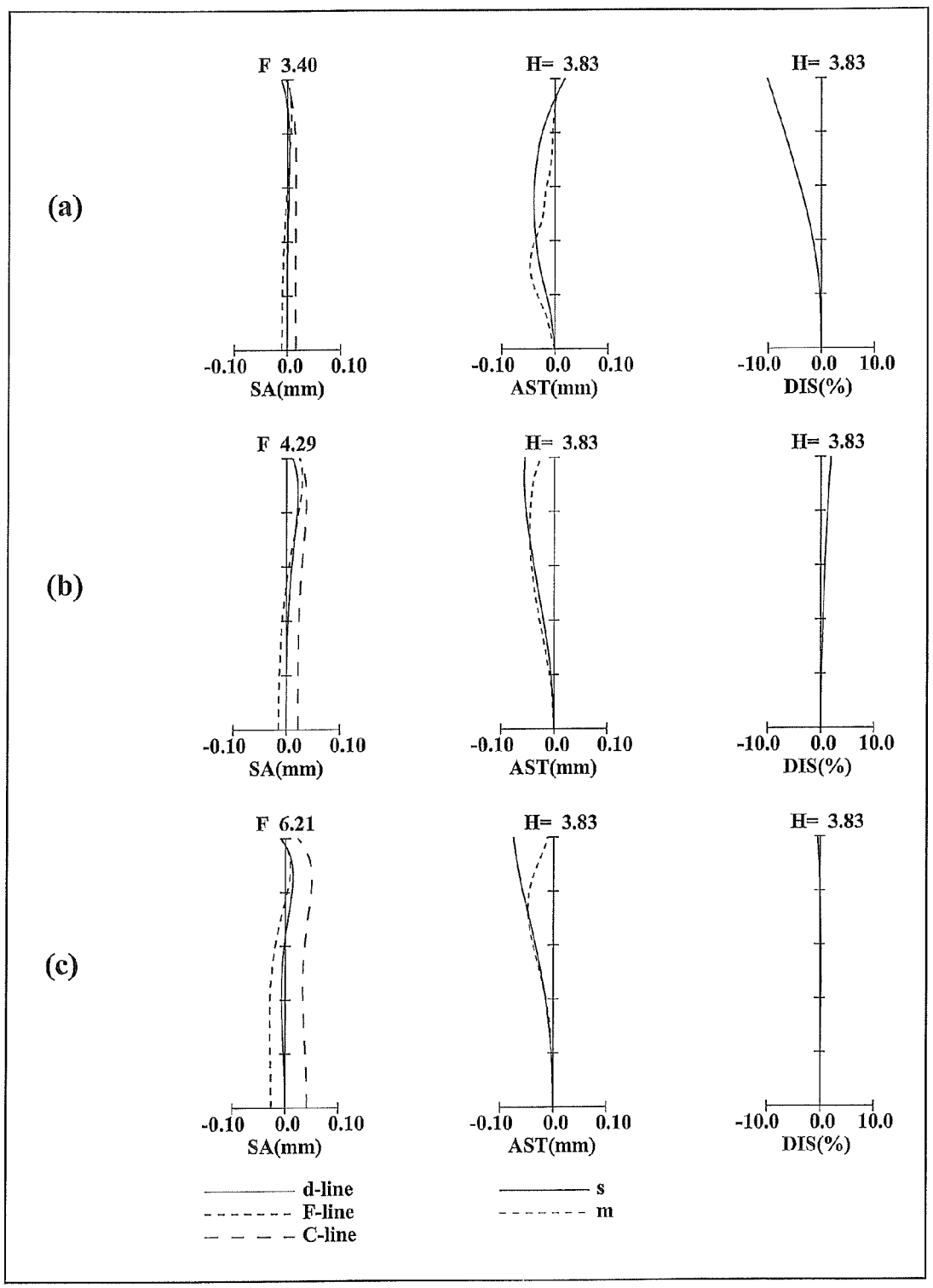
FIG. 7 is a longitudinal aberration diagram of an infinity in-focus condition of a zoom lens system according to Example 3.
Figure 8:
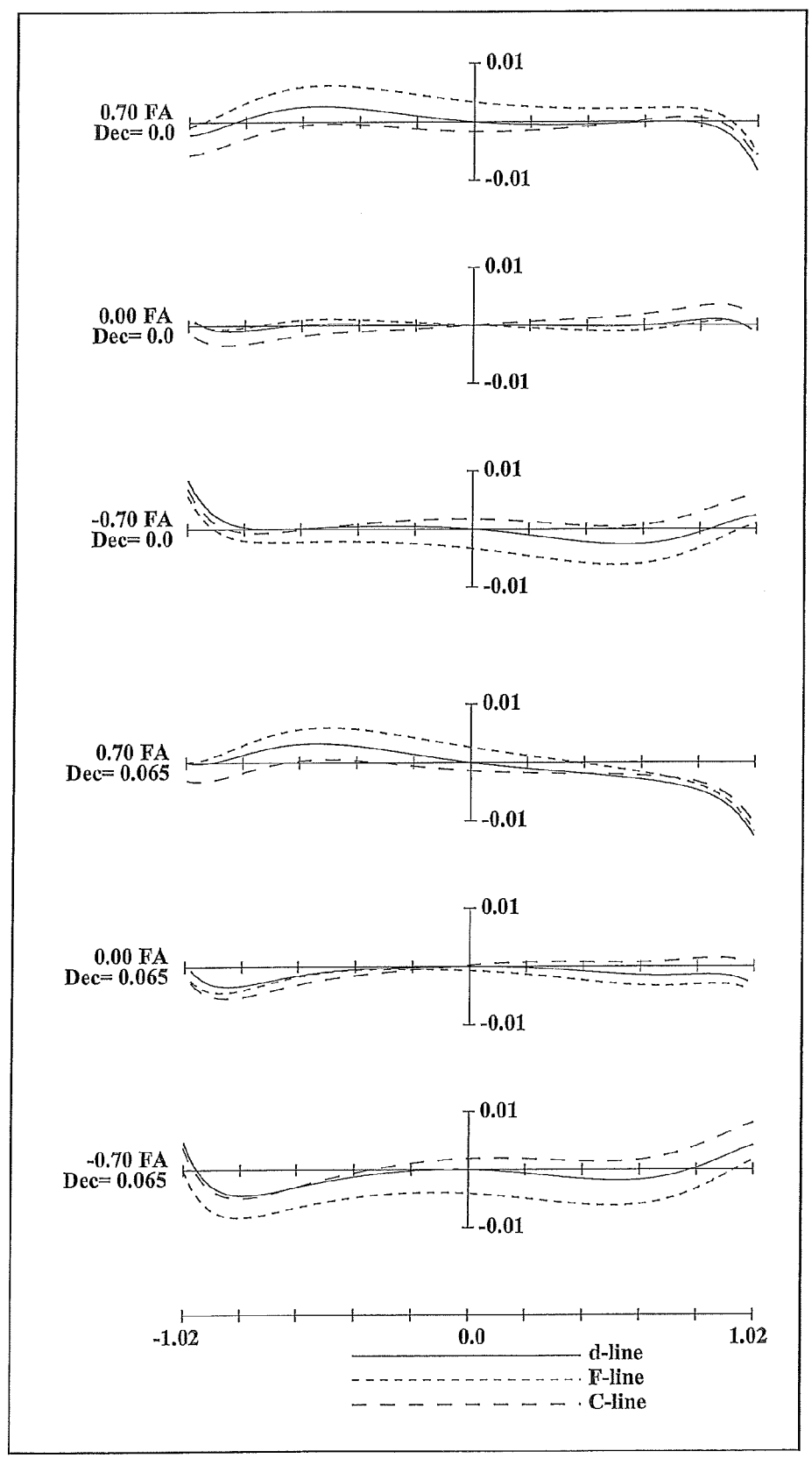
FIG. 8 is a lateral aberration diagram of a zoom lens system according to Example 3 at a telephoto limit in a basic state where image blur compensation is not performed and in a blur compensation state.

As shown in FIG. 6, in the zoom lens system according to Embodiment 3, the first lens unit G1, in order from the object side to the image side, comprises a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment 3, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 3, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 3, the fourth lens unit G4 comprises solely a positive meniscus eighth lens element L8 with the convex surface facing the image side. The eighth lens element L8 has an aspheric object side surface.

In the zoom lens system according to Embodiment 3, a plane parallel plate P is provided on the object side relative to the image surface S (between the image surface S and the eighth lens element L8).

In the zoom lens system according to Embodiment 3, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 9:
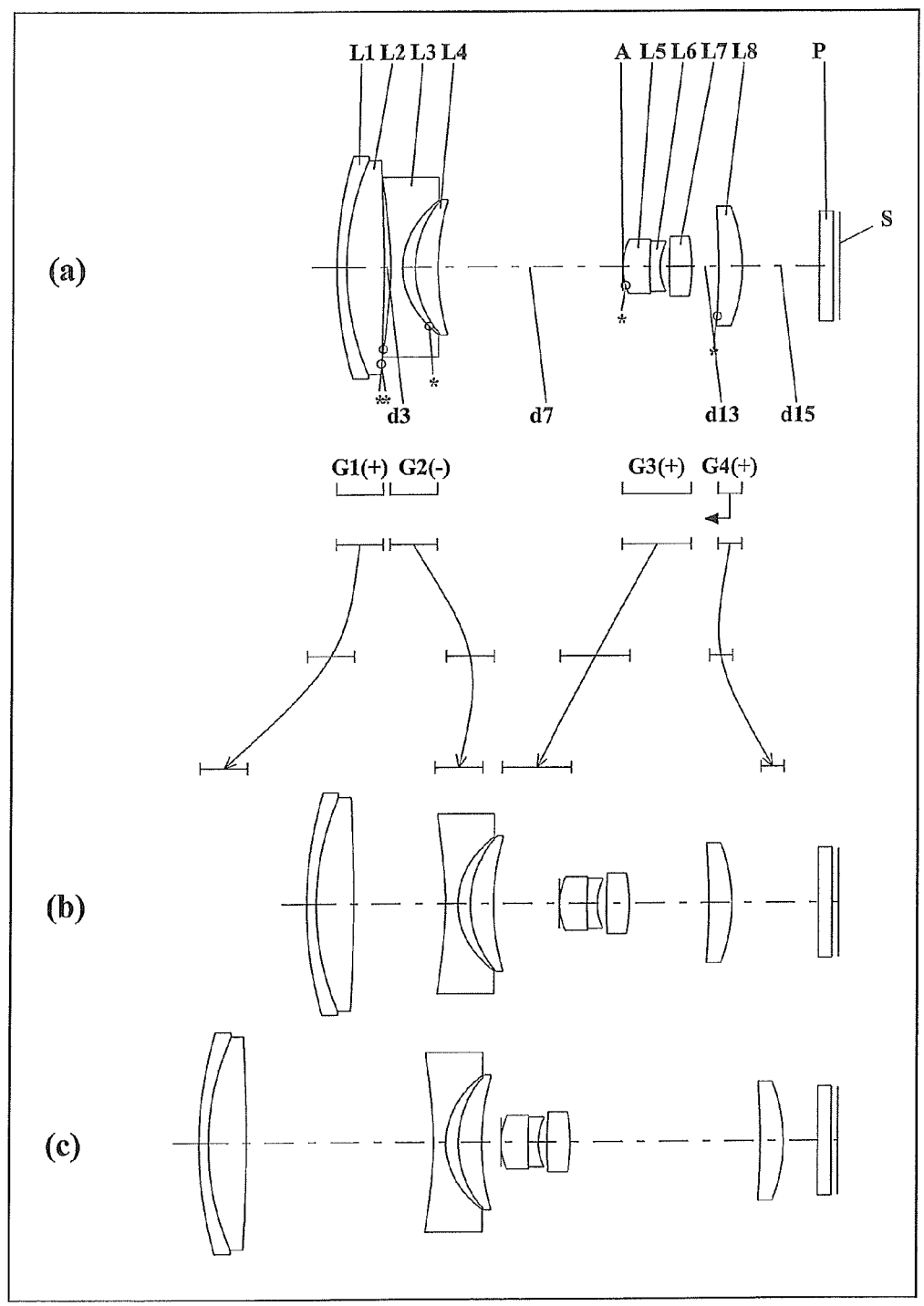
FIG. 9 is a lens arrangement diagram showing an infinity in-focus condition of a zoom lens system according to Embodiment 4 (Example 4).
Figure 10:
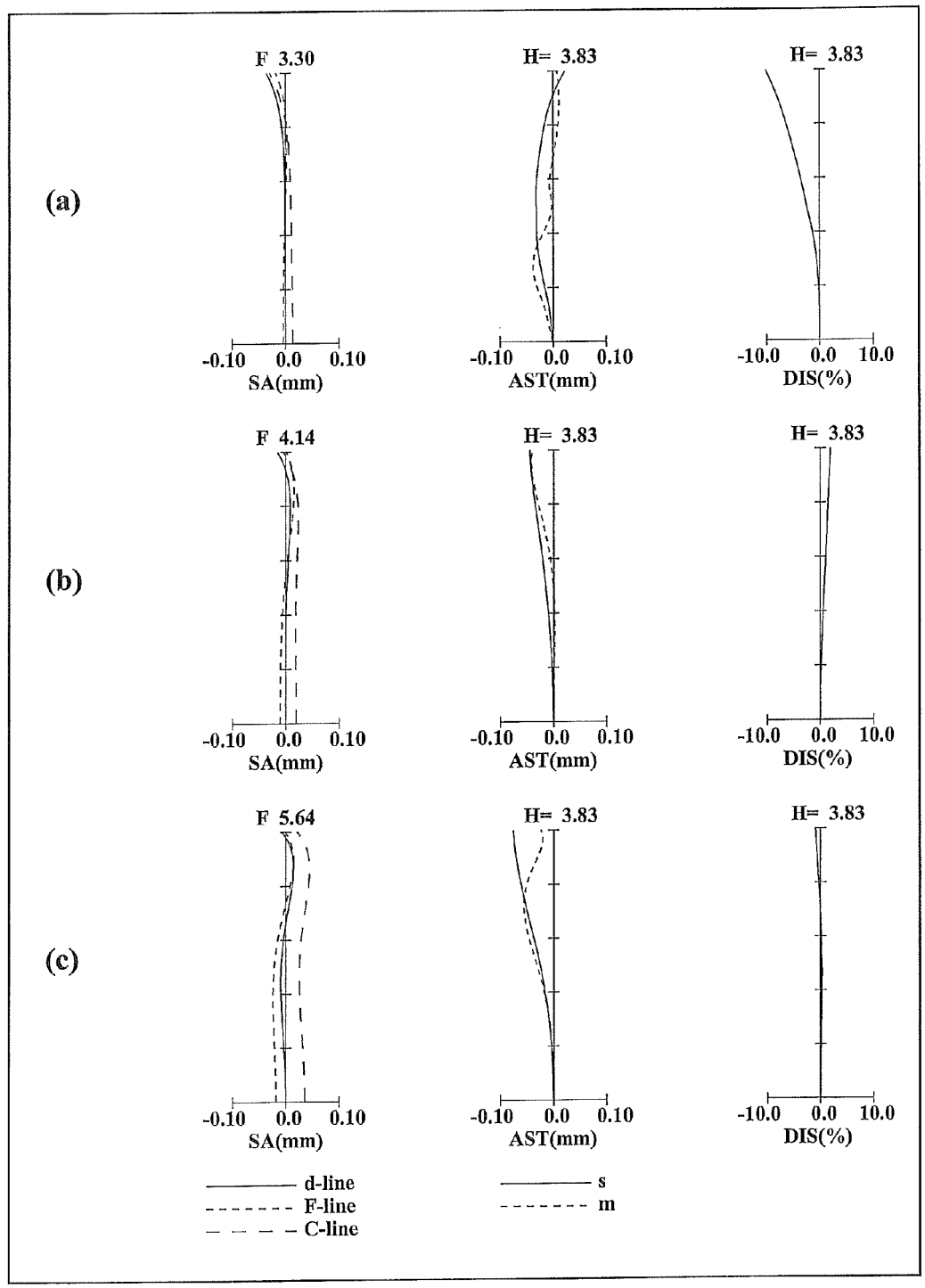
FIG. 10 is a longitudinal aberration diagram of an infinity in-focus condition of a zoom lens system according to Example 4.
Figure 11:
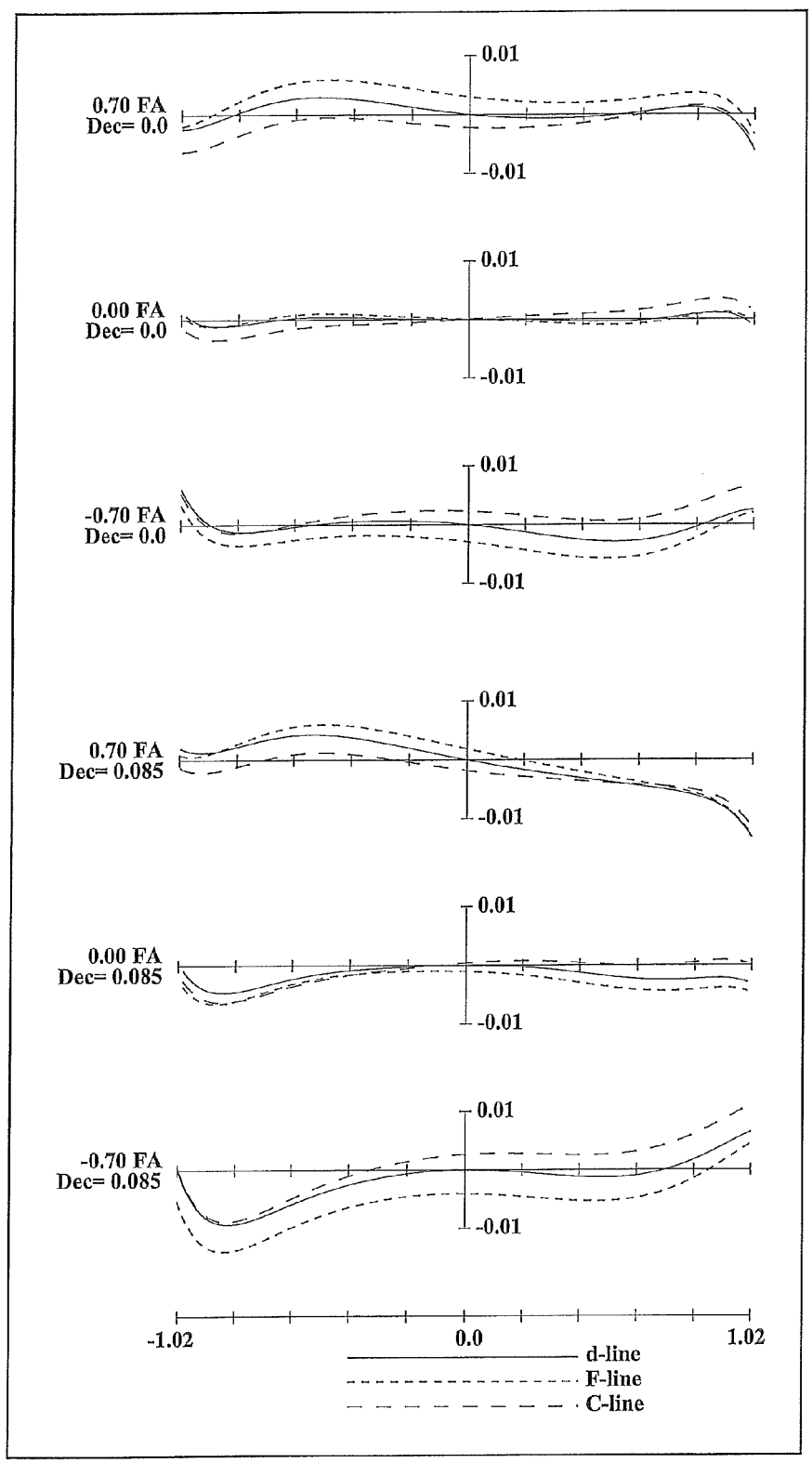
FIG. 11 is a lateral aberration diagram of a zoom lens system according to Example 4 at a telephoto limit in a basic state where image blur compensation is not performed and in a blur compensation state.

As shown in FIG. 9, in the zoom lens system according to Embodiment 4, the first lens unit G1, in order from the object side to the image side, comprises a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment 4, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 4, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 4, the fourth lens unit G4 comprises solely a positive meniscus eighth lens element L8 with the convex surface facing the image side. The eighth lens element L8 has an aspheric object side surface.

In the zoom lens system according to Embodiment 4, a plane parallel plate P is provided on the object side relative to the image surface S (between the image surface S and the eighth lens element L8).

In the zoom lens system according to Embodiment 4, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 12:
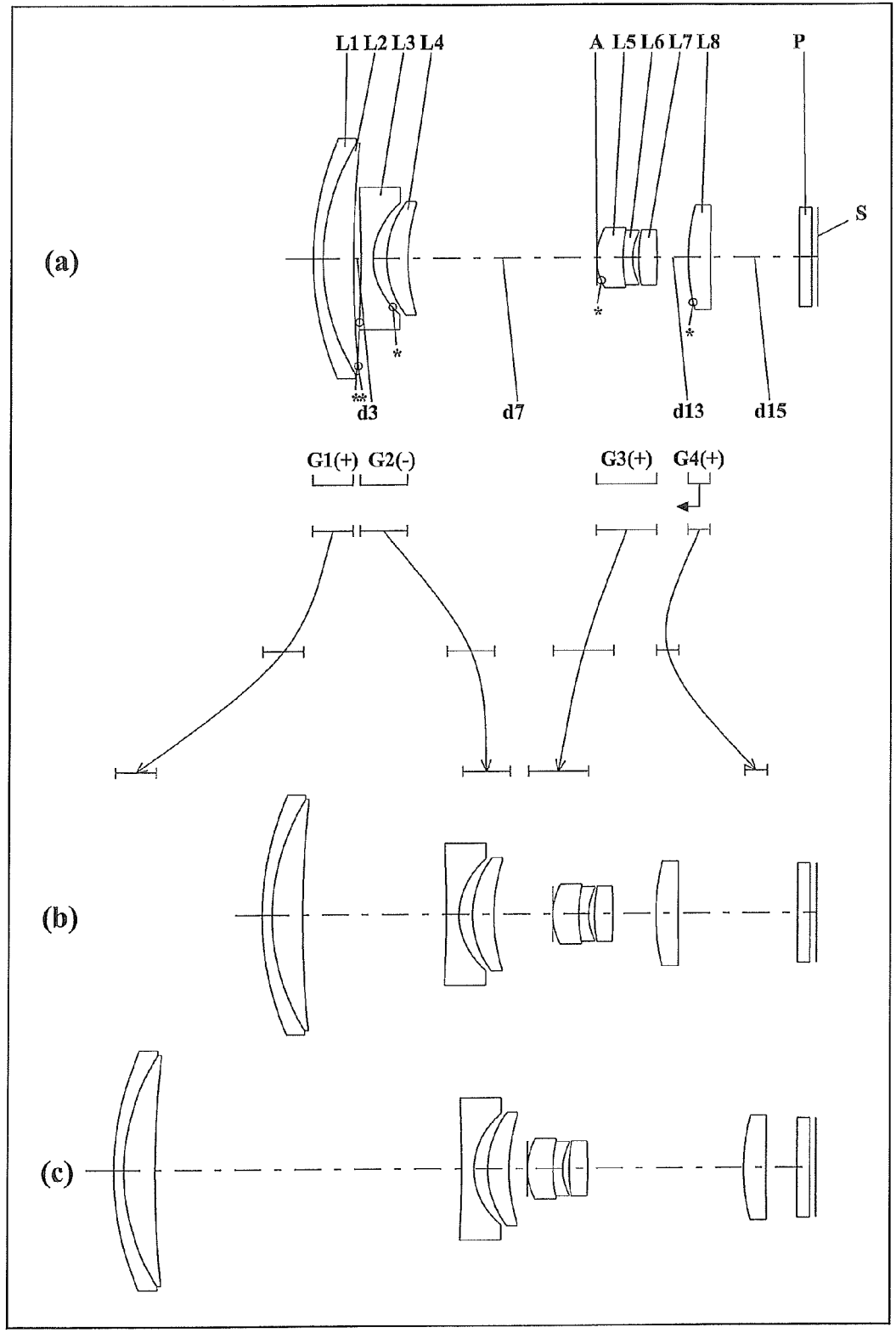
FIG. 12 is a lens arrangement diagram showing an infinity in-focus condition of a zoom lens system according to Embodiment 5 (Example 5).
Figure 13:
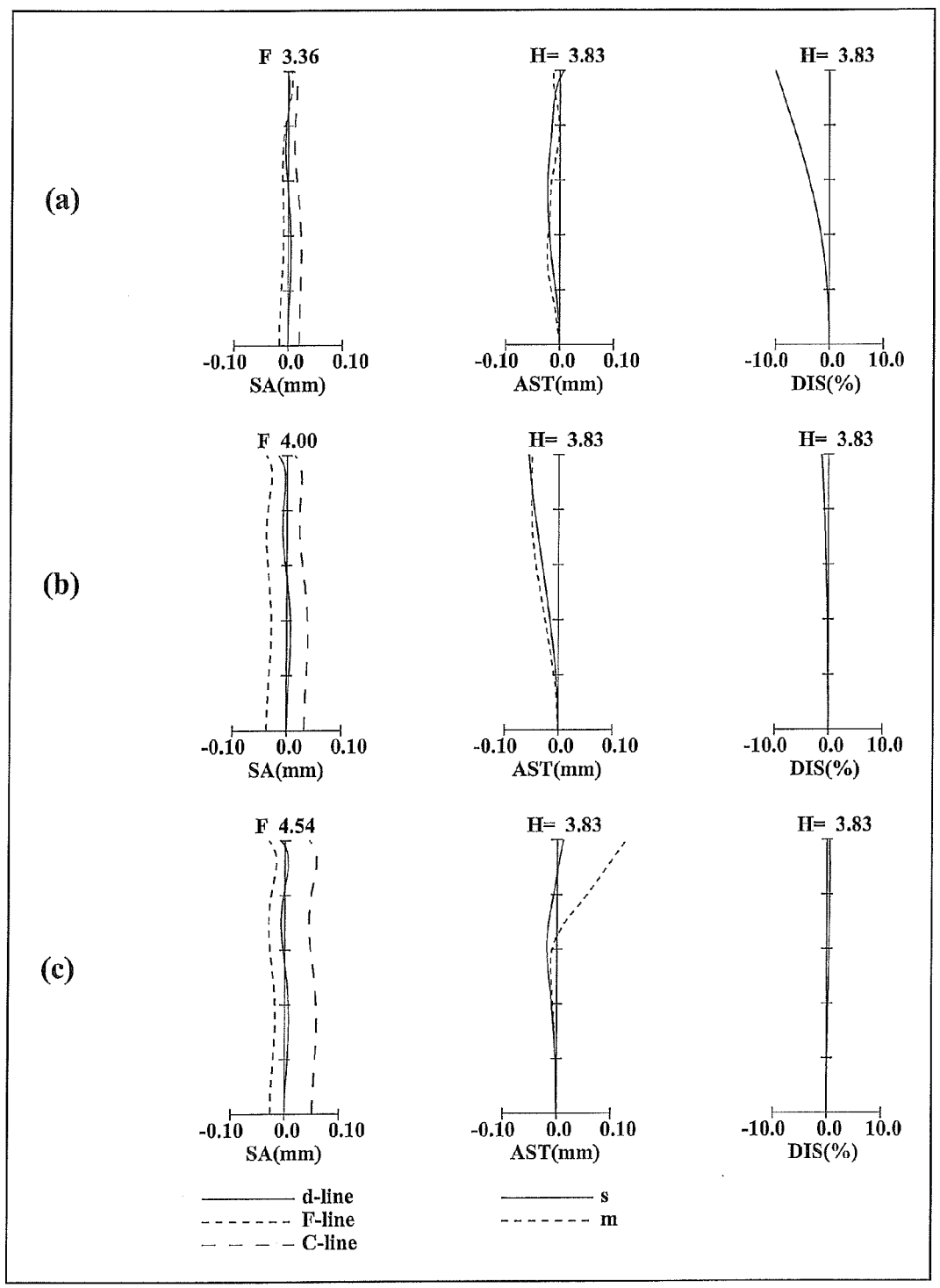
FIG. 13 is a longitudinal aberration diagram of an infinity in-focus condition of a zoom lens system according to Example 5.
Figure 14:
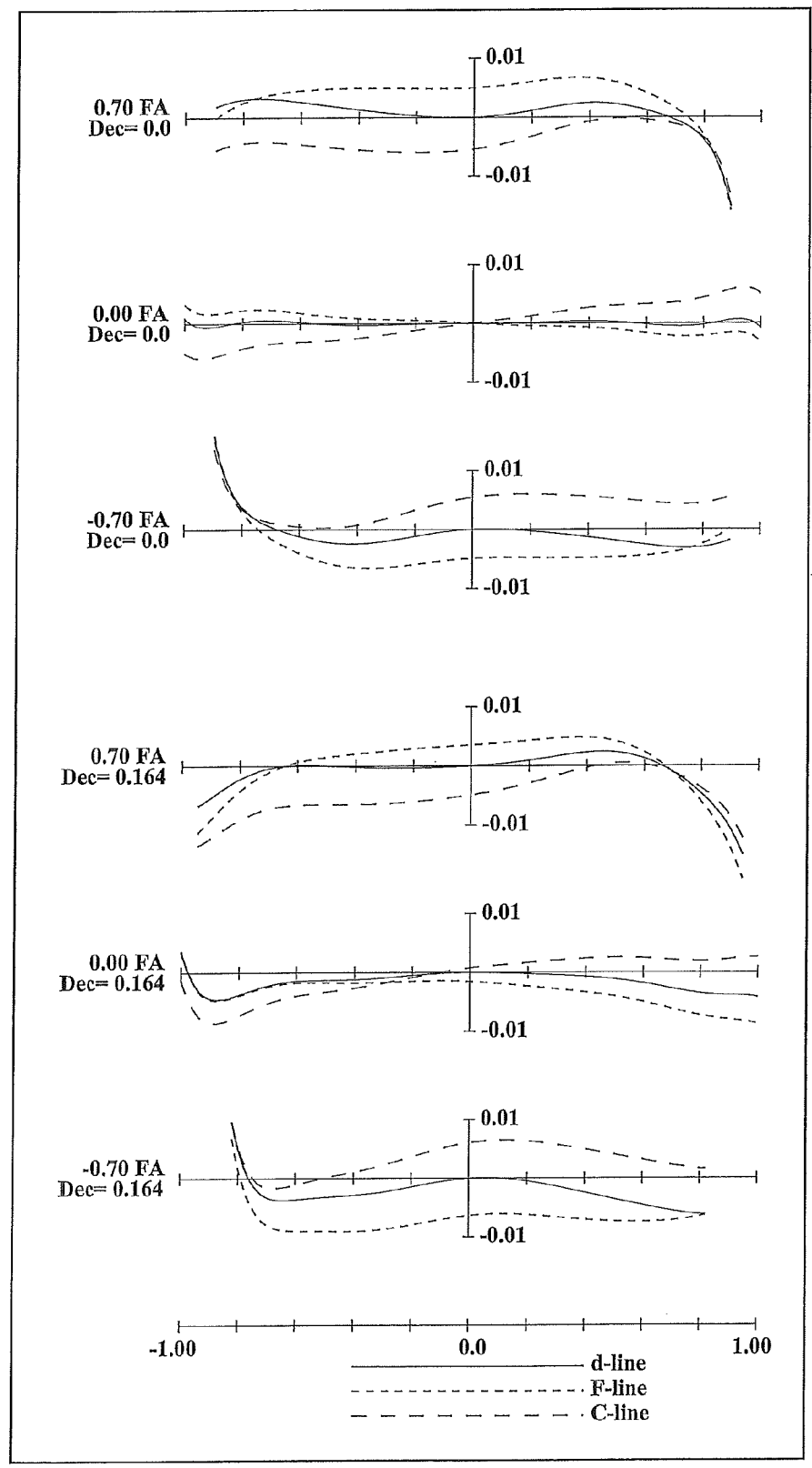
FIG. 14 is a lateral aberration diagram of a zoom lens system according to Example 5 at a telephoto limit in a basic state where image blur compensation is not performed and in a blur compensation state.

As shown in FIG. 12, in the zoom lens system according to Embodiment 5, the first lens unit G1, in order from the object side to the image side, comprises a negative meniscus first lens element L1 with the convex surface facing the object side; and a positive meniscus second lens element L2 with the convex surface facing the object side. The first lens element L1 and the second lens element L2 are cemented with each other. Further, the second lens element L2 has an aspheric image side surface.

In the zoom lens system according to Embodiment 5, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 5, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. The fifth lens element L5 has an aspheric object side surface.

In the zoom lens system according to Embodiment 5, the fourth lens unit G4 comprises solely a positive meniscus eighth lens element L8 with the convex surface facing the object side. The eighth lens element L8 has an aspheric object side surface.

In the zoom lens system according to Embodiment 5, a plane parallel plate P is provided on the object side relative to the image surface S (between the image surface S and the eighth lens element L8).

In the zoom lens system according to Embodiment 5, in zooming from a wide-angle limit to a telephoto limit at the time of image taking, the first lens unit G1 and the third lens unit G3 move to the object side, the second lens unit G2 moves to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 15:
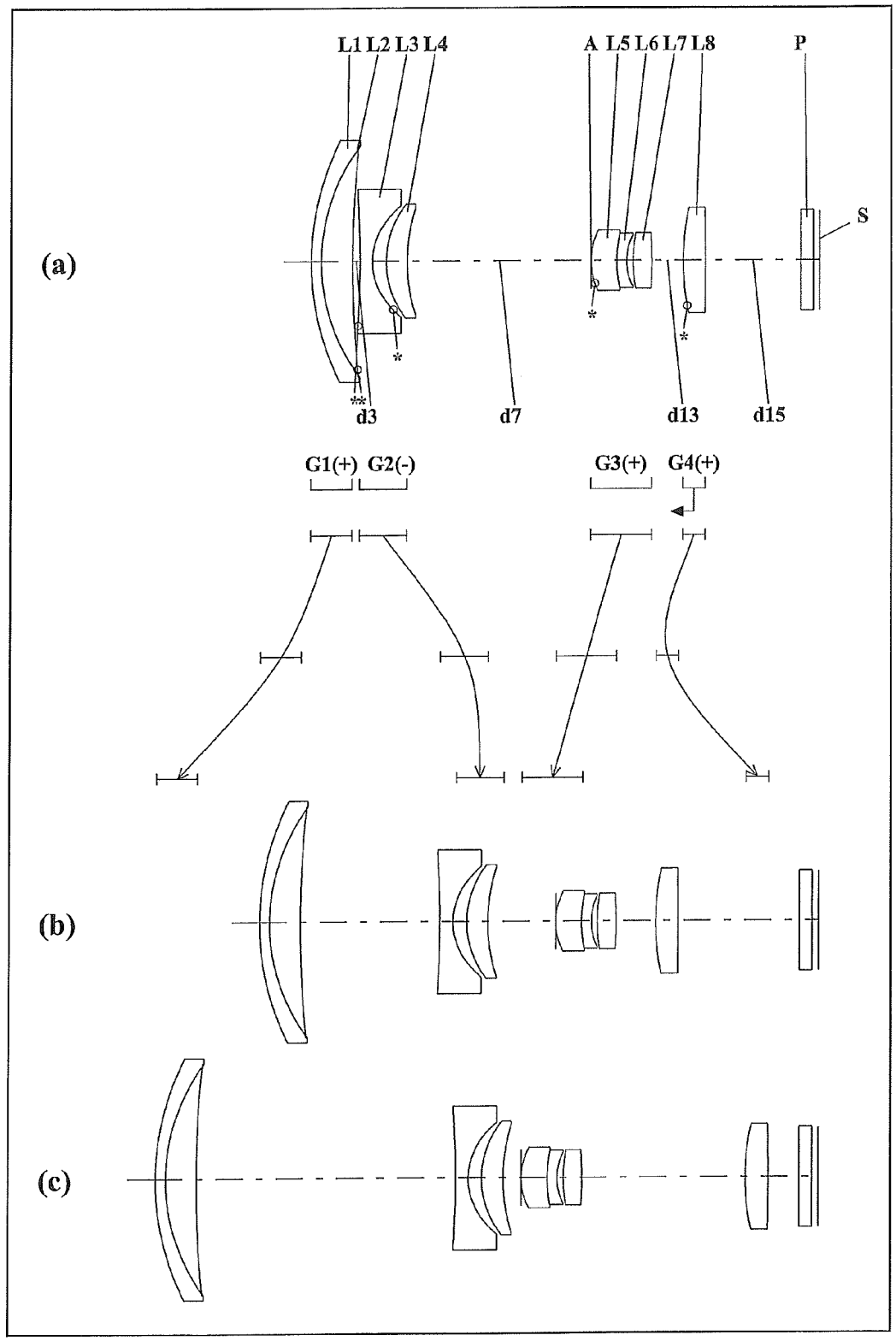
FIG. 15 is a lens arrangement diagram showing an infinity in-focus condition of a zoom lens system according to Embodiment 6 (Example 6).
Figure 16:
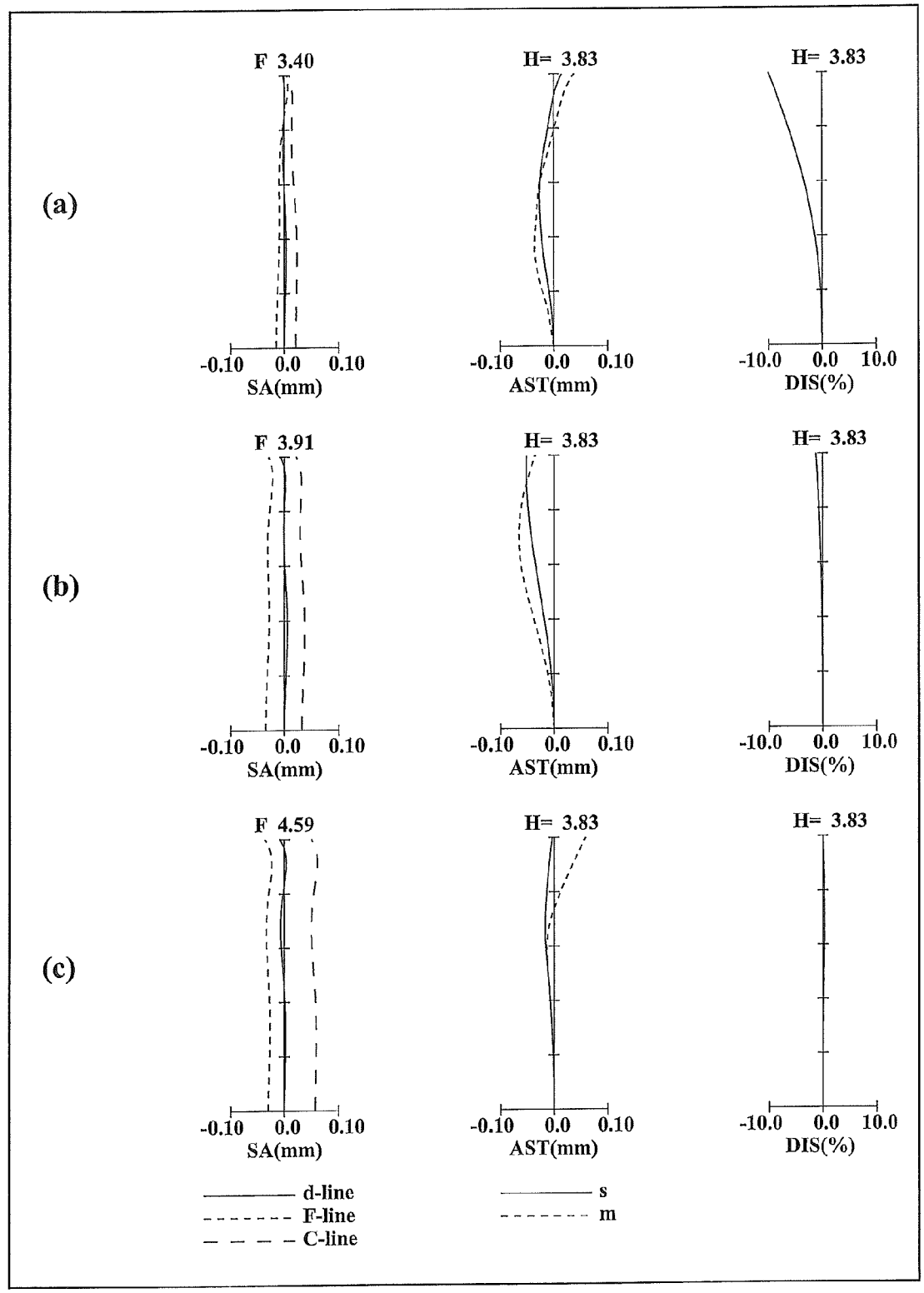
FIG. 16 is a longitudinal aberration diagram of an infinity in-focus condition of a zoom lens system according to Example 6.
Figure 17:
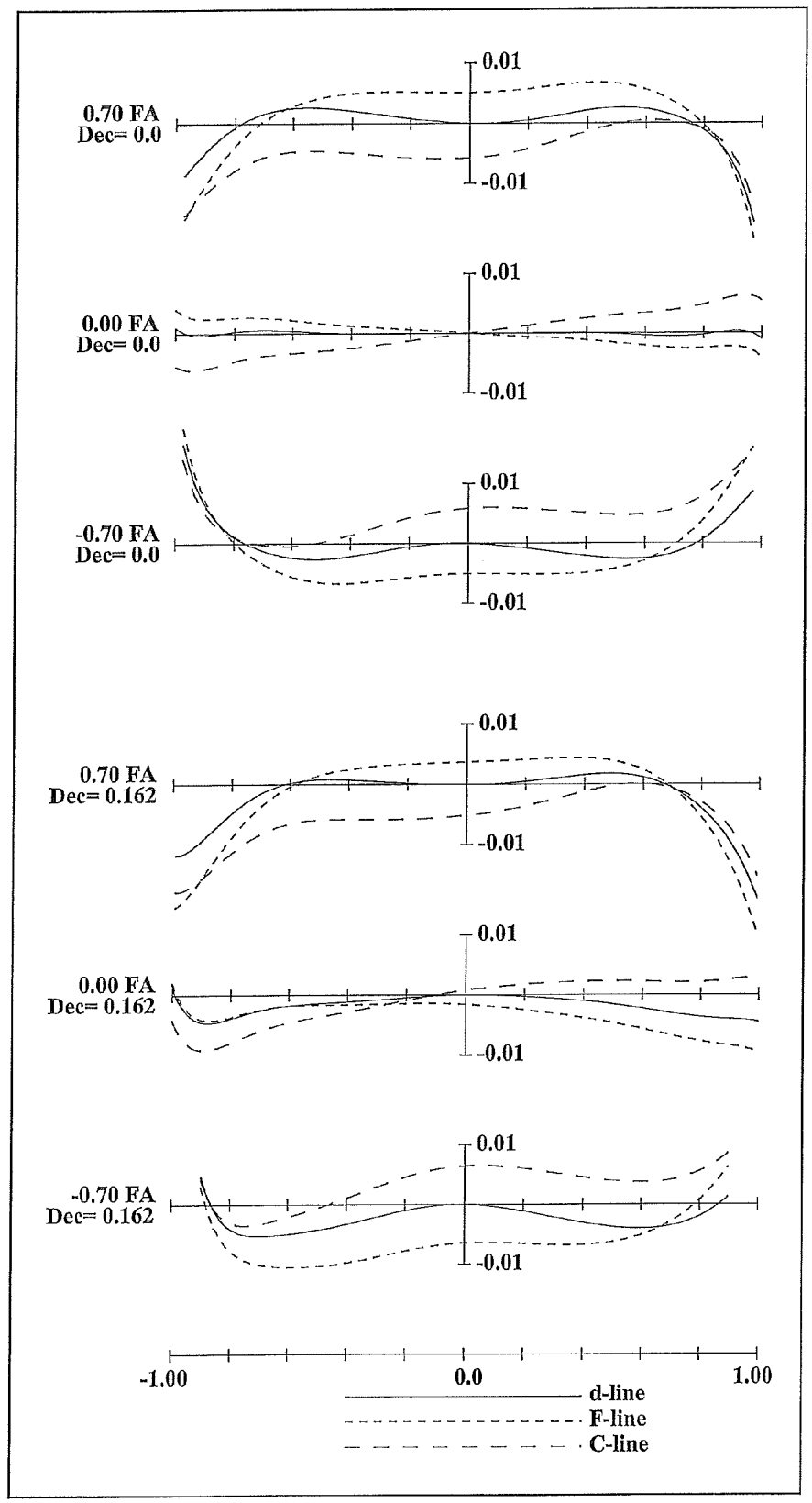
FIG. 17 is a lateral aberration diagram of a zoom lens system according to Example 6 at a telephoto limit in a basic state where image blur compensation is not performed and in a blur compensation state.

As shown in FIG. 15, in the zoom lens system according to Embodiment 6, the first lens unit G1, in order from the object side to the image side, comprises a negative meniscus first lens element L1 with the convex surface facing the object side; and a positive meniscus second lens element L2 with the convex surface facing the object side. The first lens element L1 and the second lens element L2 are cemented with each other. Further, the second lens element L2 has an aspheric image side surface.

In the zoom lens system according to Embodiment 6, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 6, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 6, the fourth lens unit G4 comprises solely a bi-convex eighth lens element L8. The eighth lens element L8 has an aspheric object side surface.

In the zoom lens system according to Embodiment 6, a plane parallel plate P is provided on the object side relative to the image surface S (between the image surface S and the eighth lens element L8).

In the zoom lens system according to Embodiment 6, in zooming from a wide-angle limit to a telephoto limit at the time of image taking, the first lens unit G1 and the third lens unit G3 move to the object side, the second lens unit G2 moves to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 18:
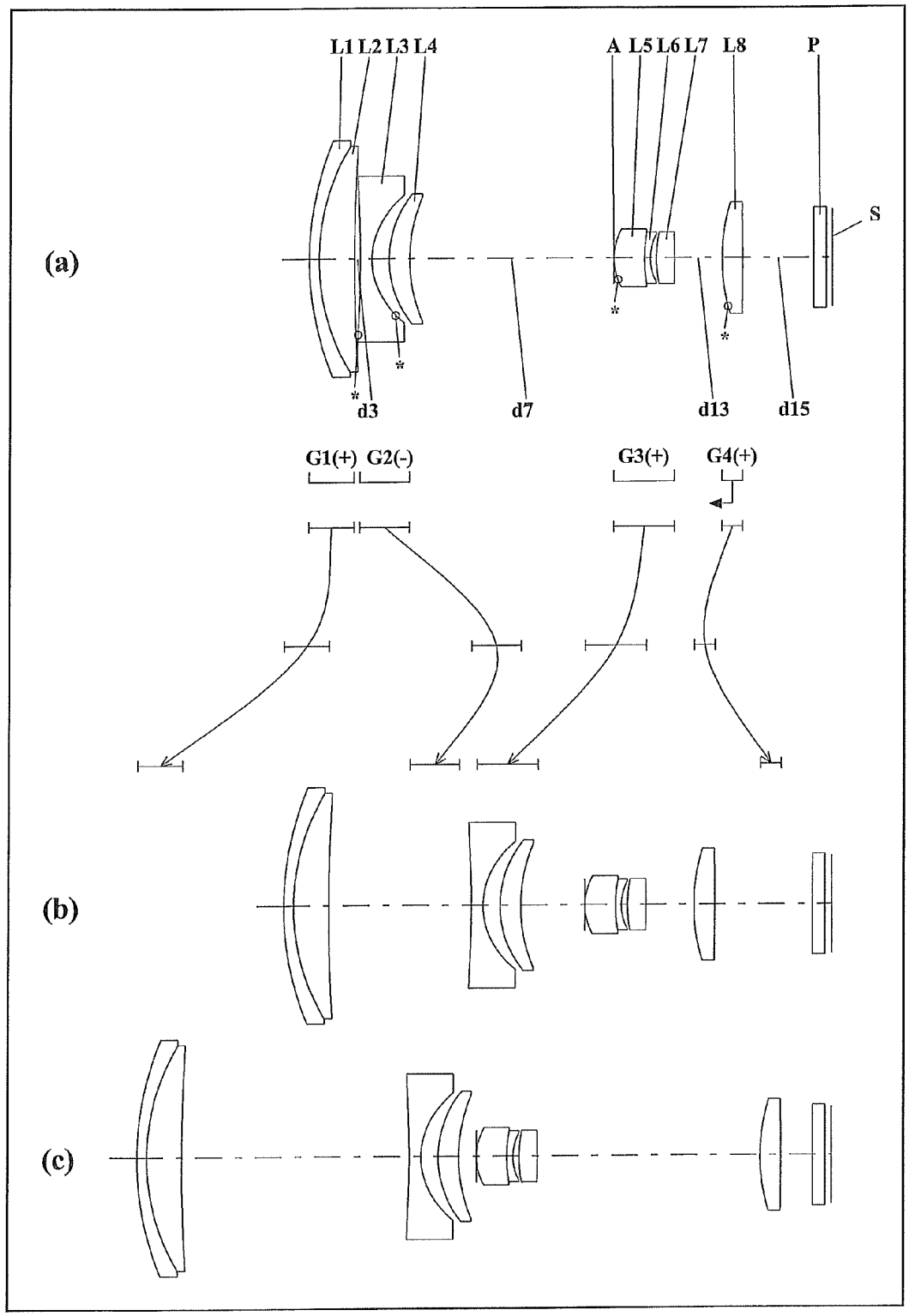
FIG. 18 is a lens arrangement diagram showing an infinity in-focus condition of a zoom lens system according to Embodiment 7 (Example 7).
Figure 19:
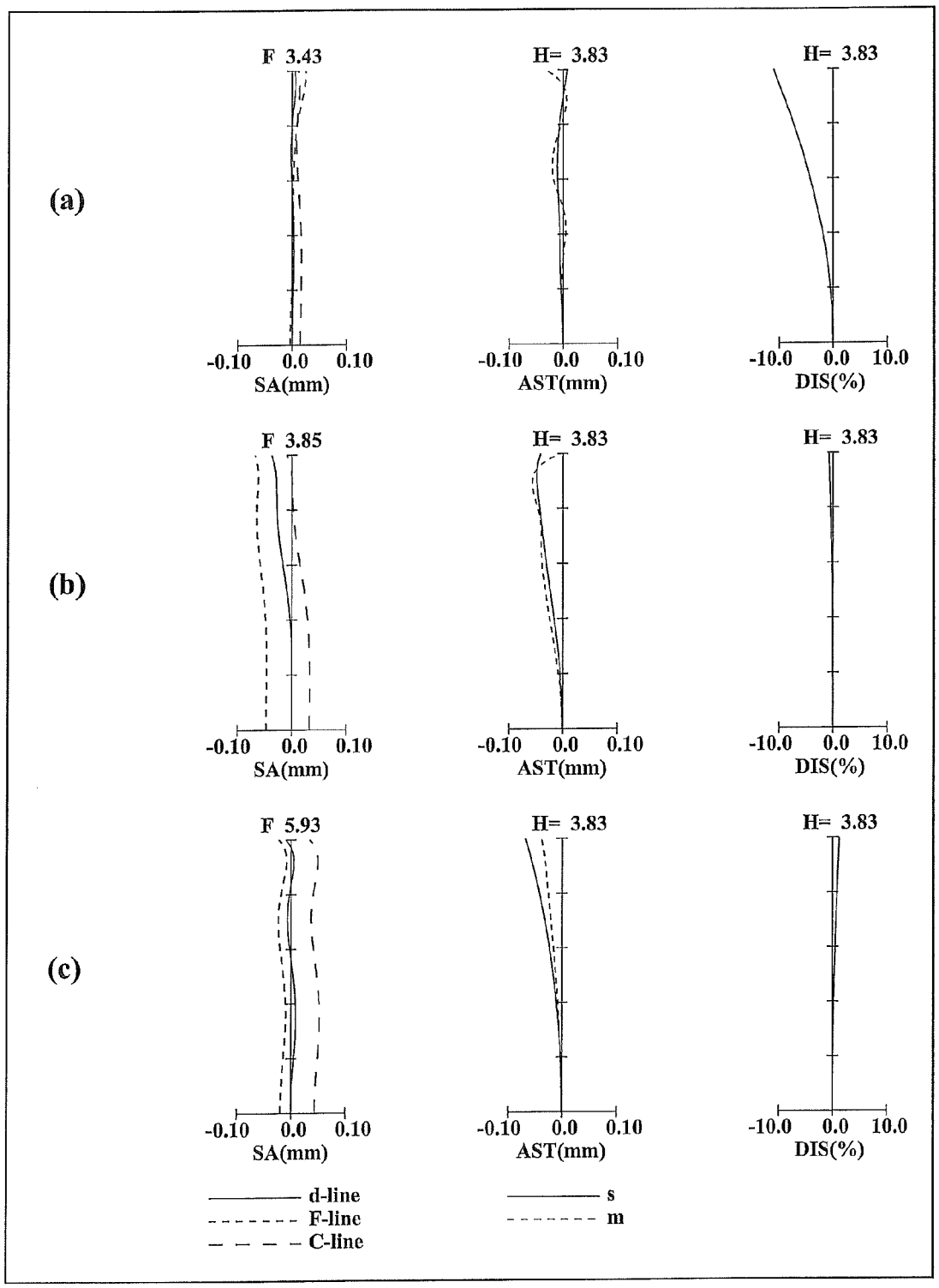
FIG. 19 is a longitudinal aberration diagram of an infinity in-focus condition of a zoom lens system according to Example 7.

As shown in FIG. 18, in the zoom lens system according to Embodiment 7, the first lens unit G1, in order from the object side to the image side, comprises a negative meniscus first lens element L1 with the convex surface facing the object side; and a positive meniscus second lens element L2 with the convex surface facing the object side. The first lens element L1 and the second lens element L2 are cemented with each other.

In the zoom lens system according to Embodiment 7, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 7, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 7, the fourth lens unit G4 comprises solely a bi-convex eighth lens element L8. The eighth lens element L8 has an aspheric object side surface.

In the zoom lens system according to Embodiment 7, a plane parallel plate P is provided on the object side relative to the image surface S (between the image surface S and the eighth lens element L8).

In the zoom lens system according to Embodiment 7, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 20:
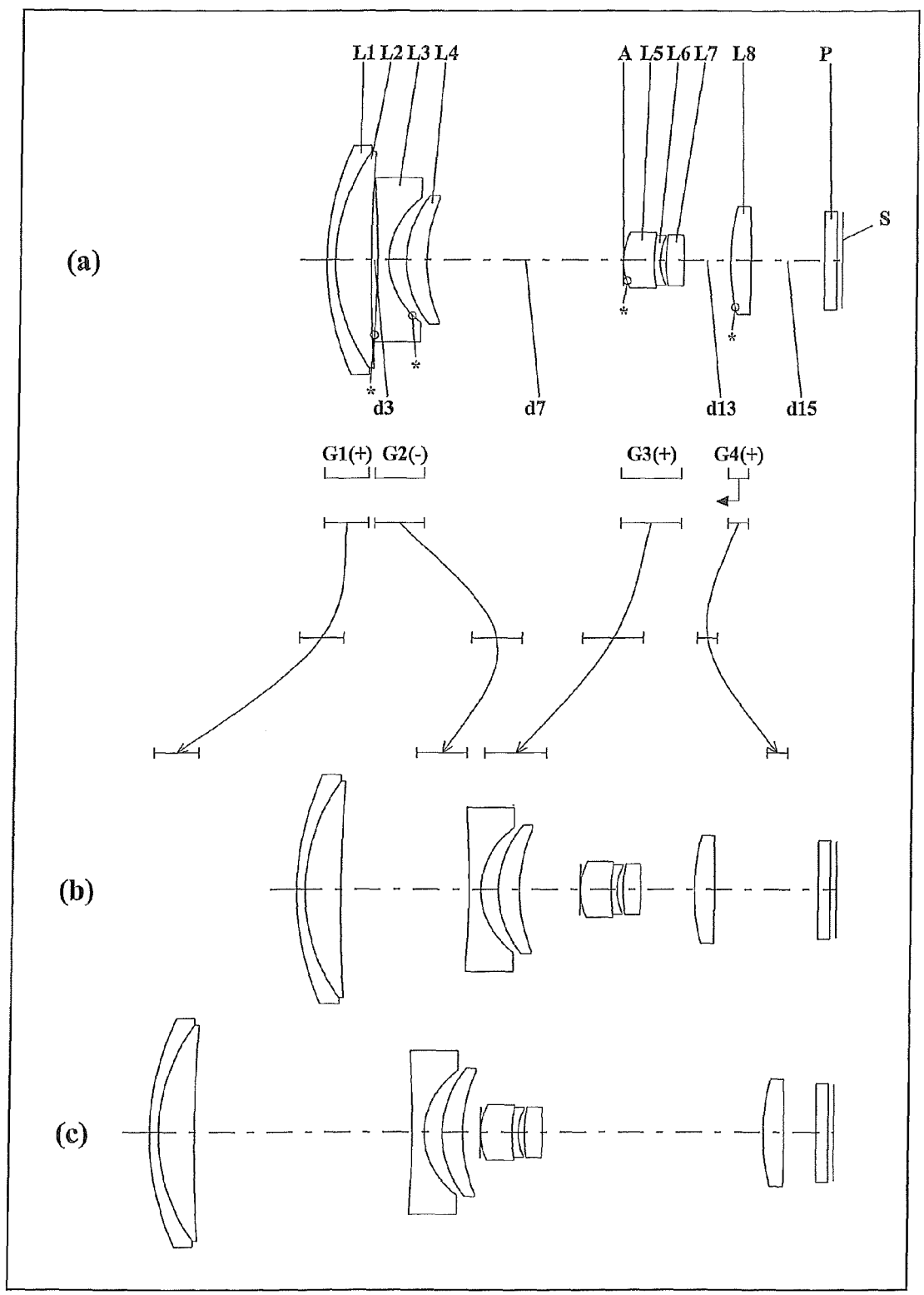
FIG. 20 is a lens arrangement diagram showing an infinity in-focus condition of a zoom lens system according to Embodiment 8 (Example 8).
Figure 21:
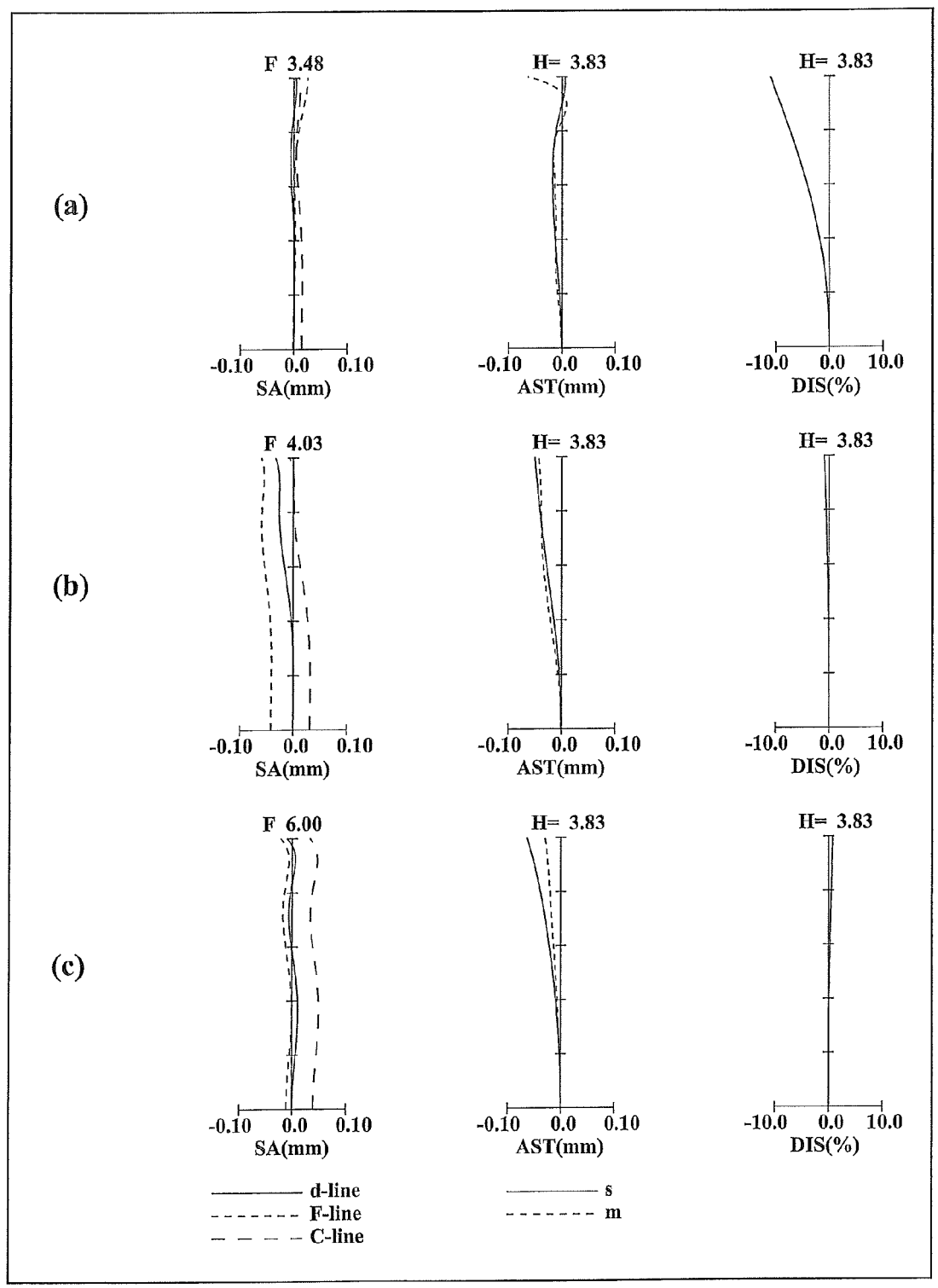
FIG. 21 is a longitudinal aberration diagram of an infinity in-focus condition of a zoom lens system according to Example 8.
Figure 22:
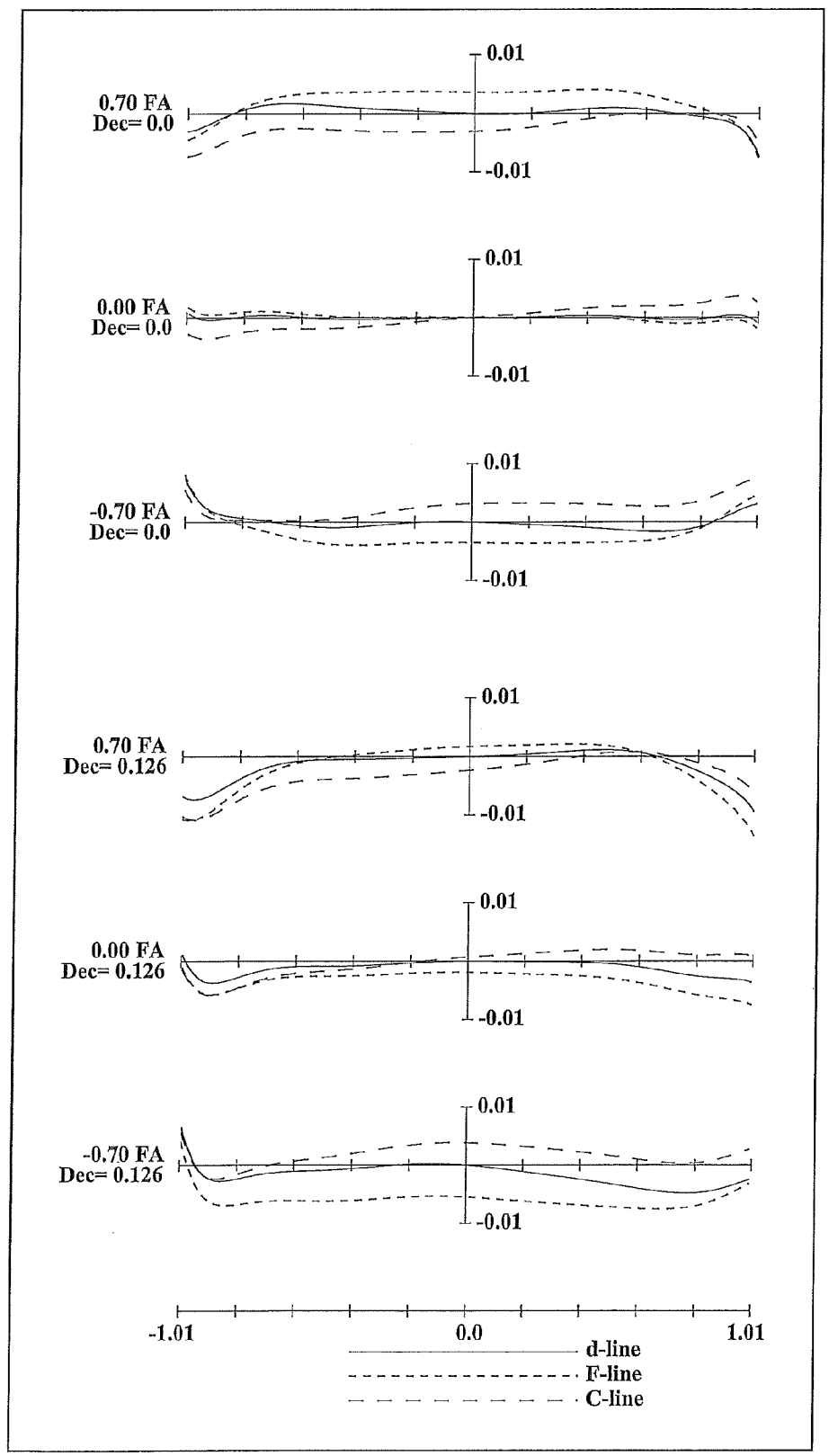
FIG. 22 is a lateral aberration diagram of a zoom lens system according to Example 8 at a telephoto limit in a basic state where image blur compensation is not performed and in a blur compensation state.

As shown in FIG. 20, in the zoom lens system according to Embodiment 8, the first lens unit G1, in order from the object side to the image side, comprises a negative meniscus first lens element L1 with the convex surface facing the object side; and a positive meniscus second lens element L2 with the convex surface facing the object side. The first lens element L1 and the second lens element L2 are cemented with each other.

In the zoom lens system according to Embodiment 8, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 8, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 8, the fourth lens unit G4 comprises solely a bi-convex eighth lens element L8. The eighth lens element L8 has an aspheric object side surface.

In the zoom lens system according to Embodiment 8, a plane parallel plate P is provided on the object side relative to the image surface S (between the image surface S and the eighth lens element L8).

In the zoom lens system according to Embodiment 8, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Figure 23:
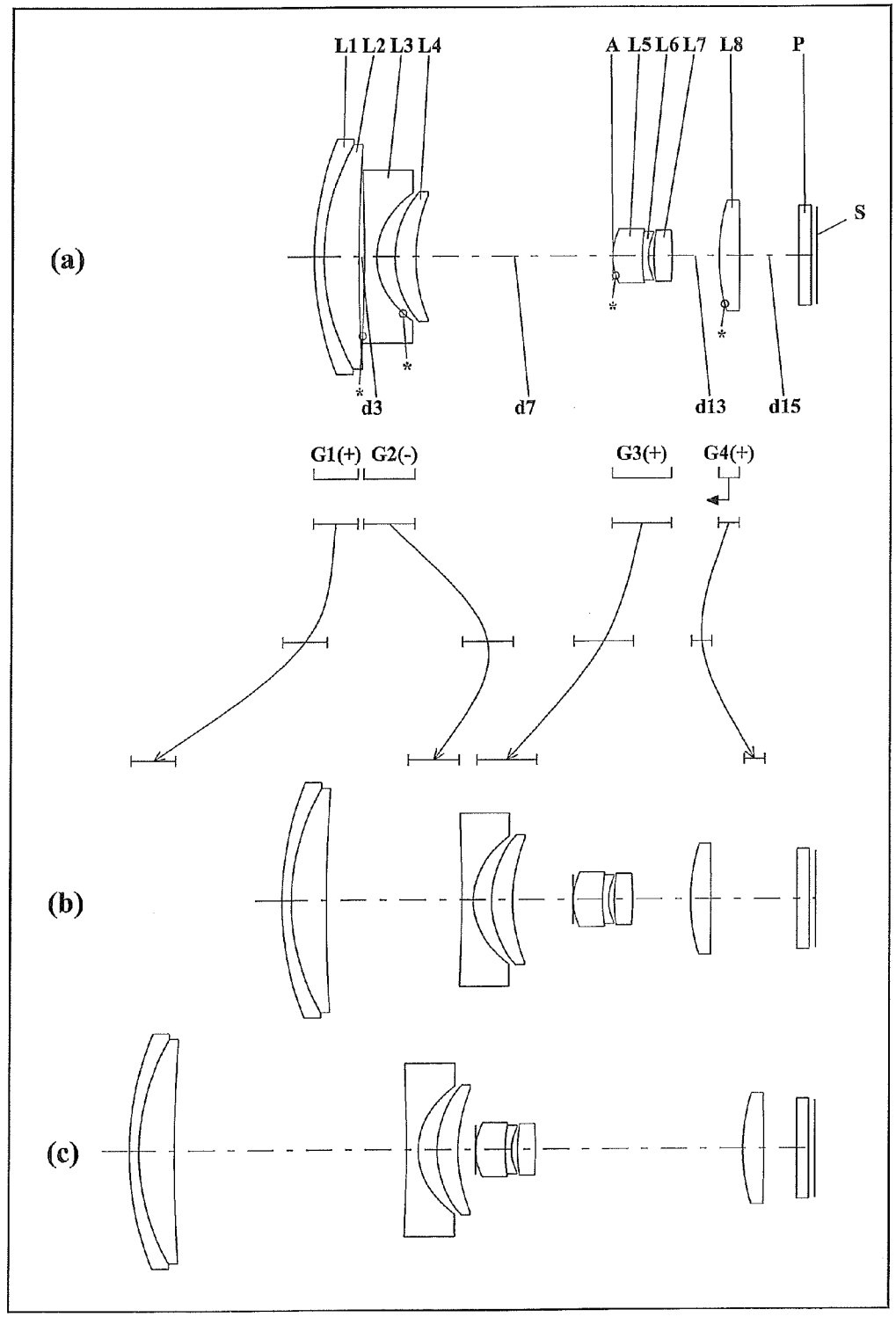
FIG. 23 is a lens arrangement diagram showing an infinity in-focus condition of a zoom lens system according to Embodiment 9 (Example 9).
Figure 24:
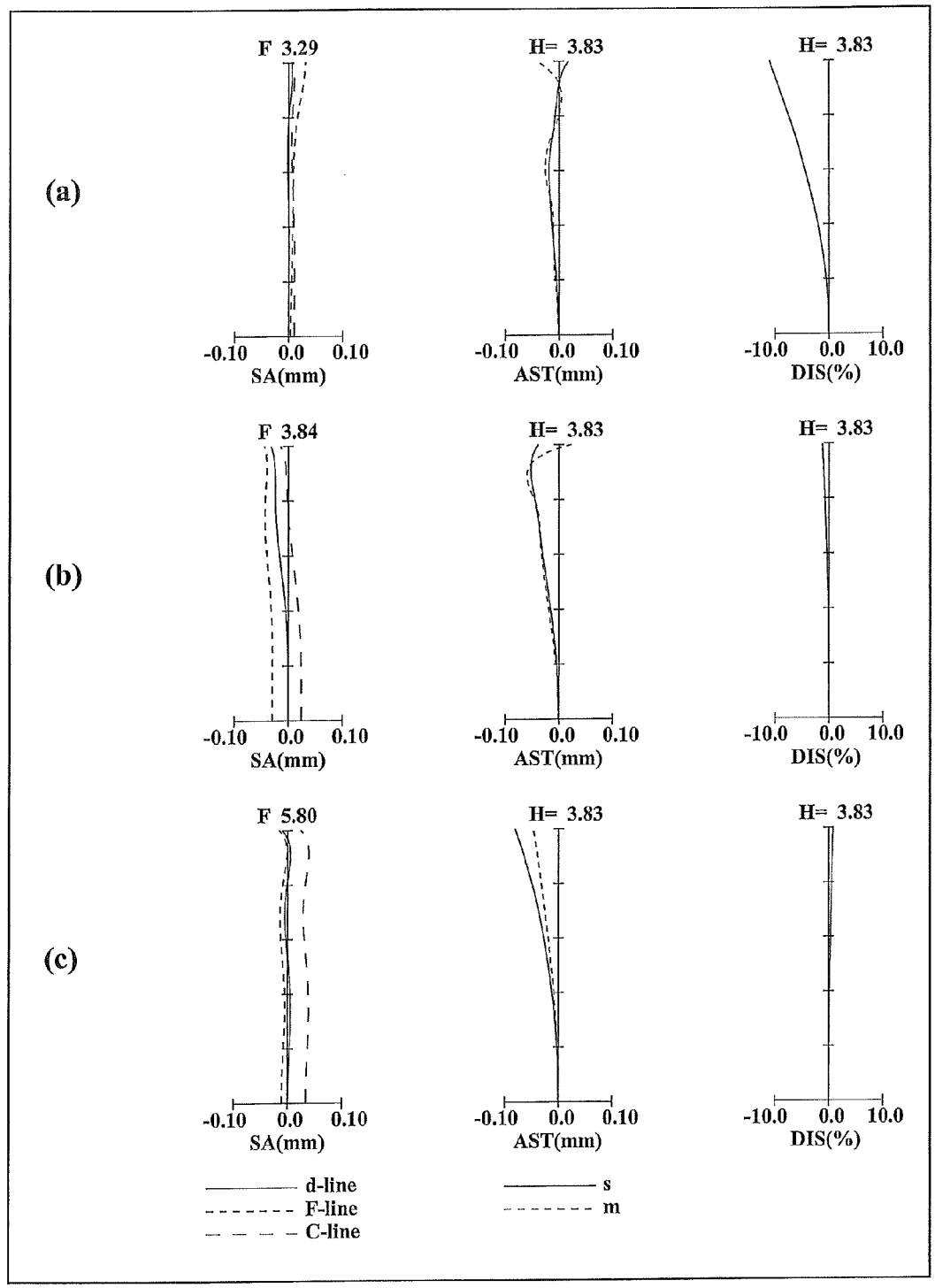
FIG. 24 is a longitudinal aberration diagram of an infinity in-focus condition of a zoom lens system according to Example 9.

As shown in FIG. 23, in the zoom lens system according to Embodiment 9, the first lens unit G1, in order from the object side to the image side, comprises a negative meniscus first lens element L1 with the convex surface facing the object side; and a positive meniscus second lens element L2 with the convex surface facing the object side. The first lens element L1 and the second lens element L2 are cemented with each other.

In the zoom lens system according to Embodiment 9, the second lens unit G2, in order from the object side to the image side, comprises a bi-concave third lens element L3; and a positive meniscus fourth lens element L4 with the convex surface facing the object side. The third lens element L3 has two aspheric surfaces.

In the zoom lens system according to Embodiment 9, the third lens unit G3, in order from the object side to the image side, comprises a positive meniscus fifth lens element L5 with the convex surface facing the object side; a negative meniscus sixth lens element L6 with the convex surface facing the object side; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 9, the fourth lens unit G4 comprises solely a bi-convex eighth lens element L8. The eighth lens element L8 has an aspheric object side surface.

In the zoom lens system according to Embodiment 9, a plane parallel plate P is provided on the object side relative to the image surface S (between the image surface S and the eighth lens element L8).

In the zoom lens system according to Embodiment 9, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

In the zoom lens systems according to Embodiments 1 to 9, the first lens unit G1 comprises two lens elements, the second lens unit G2 comprises two lens elements, and the third lens unit G3 comprises three lens elements. Thus, the lens system has a short overall optical length (overall length of lens system).

In the zoom lens systems according to Embodiments 1 to 9, the first lens unit G1, in order from the object side to the image side, is composed of the negative meniscus lens element L1 with the convex surface facing the object side, and the positive lens element L2. These two lens elements are cemented with each other to constitute a cemented lens element. Thus, a compact lens system is realized. Further, such a construction permits favorable compensation of chromatic aberration.

In the zoom lens systems according to Embodiments 1 to 9, in the second lens unit G2, the third lens element L3, which is an object side lens element, has an aspheric surface. Therefore, aberrations, particularly distortion at a wide-angle limit, can be compensated more favorably. Further, in the third lens unit G3, the fifth lens element L5, which is an object side positive lens element, has an aspheric surface. Therefore, aberrations, particularly spherical aberration, can be compensated more favorably.

In the zoom lens systems according to Embodiments 1 to 9, the third lens unit G3 is composed of three lens elements, i.e., in order from the object side to the image side, the fifth lens element L5 having positive optical power, the sixth lens element L6 having negative optical power, and the seventh lens element L7 having positive optical power. The fifth lens element L5, which is an object side positive lens element, and the sixth lens element L6 are cemented with each other to constitute a cemented lens element. Therefore, axial aberration, which occurs in the positive lens element, is compensated in the negative lens element, and thus excellent optical performance is achieved with a small number of lens elements.

In the zoom lens systems according to Embodiments 1 to 9, the fourth lens unit G4 is composed of a single lens element, and the lens element has positive optical power. Thus, the lens system has a short overall optical length (overall length of lens system). Further, at the time of focusing from an infinite-distance object to a close-distance object, as shown in each Fig., the fourth lens unit G4 is drawn out to the object side so that rapid focusing is achieved easily.

Further, in the zoom lens systems according to Embodiments 1 to 9, in zooming from a wide-angle limit to a telephoto limit at the time of image taking, the first lens unit G1, the second lens unit G2, the third lens unit G3, and the fourth lens unit G4 are moved individually along the optical axis so that zooming is achieved. Then, any lens unit among the first lens unit G1, the second lens unit G2, the third lens unit G3 and the fourth lens unit G4, or alternatively, a sub lens unit consisting of a part of a lens unit is moved in a direction perpendicular to the optical axis, so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis. Thus, image blur is compensated in a state that size increase in the entire zoom lens system is suppressed to realize a compact construction and that excellent imaging characteristics such as small decentering coma aberration and small decentering astigmatism are maintained.

In a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for conditions preferred to be satisfied by a zoom lens system like the zoom lens systems according to Embodiments 1 to 9. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

In a zoom lens system like the zoom lens systems according to Embodiments 1 to 9, in order from the object side to the image side, comprising a first lens unit having positive optical power, a second lens unit having negative optical power, a third lens unit having positive optical power, and a fourth lens unit having positive optical power, wherein the first lens unit is composed of at most two lens elements, the second lens unit is composed of two lens elements, and the third lens unit is composed of three lens elements (this lens configuration is referred to as basic configuration of the embodiments, hereinafter), the following condition (1) is satisfied.

$$nd > 1.75 \tag{1}$$

where, nd is a refractive index to the d-line of each lens element constituting the zoom lens system.

The condition (1) sets forth the refractive indices of all lens elements constituting each lens unit in the zoom lens system. When the condition (1) is satisfied, curvature of field and distortion at a wide-angle limit, and coma aberration in the entire zooming range from a wide-angle limit to a telephoto limit can be suitably compensated.

In a zoom lens system having the basic configuration like the zoom lens systems according to Embodiments 1 to 9, in which the second lens unit includes a lens element having positive optical power, it is preferable that the following condition (5) is satisfied.

$$1.88 < nd_{2p} < 2.20 \tag{5}$$

where, $nd_{2p}$ is a refractive index to the d-line of the lens element having positive optical power, which is included in the second lens unit.

The condition (5) sets forth the refractive index of the lens element having positive optical power, which is included in the second lens unit. When the value exceeds the upper limit of the condition (5), it might be difficult to realize mass production of the lens material. On the other hand, when the value goes below the lower limit of the condition (5), it might be difficult to compensate curvature of field and distortion at a wide-angle limit, and coma aberration in the entire zooming range from a wide-angle limit to a telephoto limit.

In a zoom lens system having the basic configuration like the zoom lens systems according to Embodiments 1 to 9, in which the second lens unit includes a lens element having negative optical power, it is preferable that the following condition (6) is satisfied.

$$0.35 < (r_{2na} + r_{2nb})/(r_{2na} - r_{2nb}) < 1.20 \tag{6}$$

where, $r_{2na}$ is a radius of curvature of an object side surface of the lens element having negative optical power, which is included in the second lens unit, and $r_{2nb}$ is a radius of curvature of an image side surface of the lens element having negative optical power, which is included in the second lens unit.

The condition (6) sets forth the shape factor of the lens element having negative optical power, which is included in the second lens unit. When the value exceeds the upper limit of the condition (6), it might be difficult to compensate curvature of field and distortion at a wide-angle limit. On the other hand, when the value goes below the lower limit of the condition (6), it might be difficult to compensate coma aberration in the entire zooming range from a wide-angle limit to a telephoto limit.

In a zoom lens system having the basic configuration like the zoom lens systems according to Embodiments 1 to 9, in which the second lens is composed of two lens elements, i.e., in order from the object side to the image side, a lens element having negative optical power and a lens element having positive optical power, it is preferable that the following condition (7) is satisfied.

$$-8.5 < (r_{2nb} + r_{2pa})/(r_{2nb} - r_{2pa}) < -3.5 \tag{7}$$

where, $r_{2nb}$ is a radius of curvature of an image side surface of the lens element having negative optical power, which is included in the second lens unit, and $r_{2pa}$ is a radius of curvature of an object side surface of the lens element having positive optical power, which is included in the second lens unit.

The condition (7) sets forth the shape factor of an air lens between the two lens elements constituting the second lens unit. When the value exceeds the upper limit of the condition (7), it might be difficult to compensate curvature of field and distortion at a wide-angle limit. On the other hand, when the value goes below the lower limit of the condition (7), it might be difficult to compensate coma aberration in the entire zooming range from a wide-angle limit to a telephoto limit.

In a zoom lens system having the basic configuration like the zoom lens systems according to Embodiments 1 to 9, in which the first lens unit includes a lens element having positive optical power, it is preferable that the following condition (8) is satisfied.

$$-1.80<(r_{1pa}+r_{1pb})/(r_{1pa}-r_{1pb})<0.00 \tag{8}$$

where, $r_{1pa}$ is a radius of curvature of an object side surface of the lens element having positive optical power, which is included in the first lens unit, and $r_{1pb}$ is a radius of curvature of an image side surface of the lens element having positive optical power, which is included in the first lens unit.

The condition (8) sets forth the shape factor of the lens element having positive optical power, which is included in the first lens unit. When the value exceeds the upper limit of the condition (8), it might be difficult to compensate coma aberration at a telephoto limit. On the other hand, when the value goes below the lower limit of the condition (8), it might be difficult to compensate curvature of field at a wide-angle limit.

When at least one of the following conditions (8)' and (8)" is satisfied, the above-mentioned effect is achieved more successfully.

$$-1.47<(r_{1pa}+r_{1pb})/(r_{1pa}-r_{1pb}) \tag{8}'$$

$$(r_{1pa}+r_{1pb})/(r_{1pa}-r_{1pb})<-0.20 \tag{8}''$$

In a zoom lens system having the basic configuration like the zoom lens systems according to Embodiments 1 to 9, it is preferable that the following condition (9) is satisfied.

$$1.87<f_3/f_W<3.00 \tag{9}$$

in which, $$\omega_W \geq 30 \tag{a-2}$$

$$f_T/f_W>4.5 \tag{b-2}$$

where, $f_3$ is a composite focal length of the third lens unit,
$\omega_W$ is a half view angle (°) at a wide-angle limit,
$f_T$ is a focal length of the entire system at a telephoto limit, and
$f_W$ is a focal length of the entire system at a wide-angle limit.

The condition (9) sets forth a suitable focal length of the third lens unit. When the value exceeds the upper limit of the condition (9), the focal length of the third lens unit becomes excessively long, which might result in difficulty in achieving a compact zoom lens system. Further, when the value exceeds the upper limit of the condition (9), the amount of movement of, for example, the third lens unit becomes excessively great when the third lens unit is moved in a direction perpendicular to the optical axis for blur compensation. Such a situation is not desirable. On the other hand, when the value goes below the lower limit of the condition (9), the focal length of the third lens unit becomes excessively short. Then, the aberration compensation capability of the third lens unit becomes excessively high, and compensation of various aberrations is not well-balanced, which might result in difficulty in achieving a compact zoom lens system.

When at least one of the following conditions (9)' and (9)" is satisfied, the above-mentioned effect is achieved more successfully.

$$1.90<f_3/f_W \tag{9}'$$

$$f_3/f_W<2.10 \tag{9}''$$

in which, $$\omega_W \geq 30 \tag{a-2}$$

$$f_T/f_W>4.5 \tag{b-2}$$

More preferably, the condition (9), or at least one of the conditions (9)' and (9)" is satisfied with satisfying the following condition (a-1).

$$\omega_W \geq 36 \tag{a-1}$$

More preferably, the condition (9), or at least one of the conditions (9)' and (9)" is satisfied with satisfying the following condition (b-1).

$$f_T/f_W>6.0 \tag{b-1}$$

In a zoom lens system having the basic configuration like the zoom lens systems according to Embodiments 1 to 9, in which the third lens unit is composed of three lens elements, i.e., in order from the object side to the image side, an object side lens element having positive optical power, a lens element having negative optical power, and an image side lens element having positive optical power, it is preferable that the following condition (10) is satisfied.

$$0.5<f_{3IL}/f_3<1.5 \tag{10}$$

in which, $$\omega_w \geq 30 \tag{a-2}$$

$$f_T/f_W>4.5 \tag{b-2}$$

where, $f_{3IL}$ is a focal length of the image side lens element having positive optical power, which is included in the third lens unit,
$f_3$ is a composite focal length of the third lens unit.
$\omega_W$ is a half view angle (°) at a wide-angle limit,
$f_T$ is a focal length of the entire system at a telephoto limit, and
$f_W$ is a focal length of the entire system at a wide-angle limit.

The condition (10) sets forth a suitable focal length of the image side lens element having positive optical power, which is included in the third lens unit. When the value exceeds the upper limit of the condition (10), it might be difficult to compensate spherical aberration and coma aberration in a balanced manner by other lens elements, although the overall optical length can be reduced. On the other hand, when the value goes below the lower limit of the condition (10), it might be difficult to reduce the overall optical length, although spherical aberration and coma aberration can be compensated in a balanced manner by other lens elements.

More preferably, the condition (10) is satisfied with satisfying the following condition (a-1).

$$\omega_W \geq 36 \tag{a-1}$$

More preferably, the condition (10) is satisfied with satisfying the following condition (b-1).

$$f_T/f_W > 6.0 \tag{b-1}$$

In a zoom lens system having the basic configuration like the zoom lens systems according to Embodiments 1 to 9, in which the third lens unit is composed of three lens elements, i.e., in order from the object side to the image side, an object side lens element having positive optical power, a lens element having negative optical power, and an image side lens element having positive optical power, it is preferable that the following condition (11) is satisfied.

$$-1.00 < f_{3n}/f_3 < -0.25 \tag{11}$$

in which, $$\omega_W \geq 30 \tag{a-2}$$

$$f_T/f_W > 4.5 \tag{b-2}$$

where, $f_{3n}$ is a focal length of the lens element having negative optical power, which is included in the third lens unit, $f_3$ is a composite focal length of the third lens unit.

$\omega_W$ is a half view angle (°) at a wide-angle limit, $f_T$ is a focal length of the entire system at a telephoto limit, and $f_W$ is a focal length of the entire system at a wide-angle limit.

The condition (11) sets forth a suitable focal length of the lens element having negative optical power, which is included in the third lens unit. When the value exceeds the upper limit of the condition (11), it might be difficult to compensate spherical aberration and coma aberration in a balanced manner by other lens elements, although the overall optical length can be reduced. On the other hand, when the value goes below the lower limit of the condition (11), it might be difficult to reduce the overall optical length, although spherical aberration and coma aberration can be compensated in a balanced manner by other lens elements.

When at least one of the following conditions (11)' and (11)'' is satisfied, the above-mentioned effect is achieved more successfully.

$$-0.68 < f_{3n}/f_3 \tag{11}'$$

$$f_{3n}/f_3 < -0.35 \tag{11}''$$

in which, $$\omega_W \geq 30 \tag{a-2}$$

$$f_T/f_W > 4.5 \tag{b-2}$$

More preferably, the condition (11), or at least one of the conditions (11)' and (11)'' is satisfied with satisfying the following condition (a-1).

$$\omega_W \geq 36 \tag{a-1}$$

More preferably, the condition (11), or at least one of the conditions (11)' and (11)'' is satisfied with satisfying the following condition (b-1).

$$f_T/f_W > 6.0 \tag{b-1}$$

In a zoom lens system having the basic configuration like the zoom lens systems according to Embodiments 1 to 9, it is preferable that the following conditions (12) and (14) are simultaneously satisfied.

$$nd_{1ave} > 1.765 \tag{12}$$

$$nd_{3ave} > 1.830 \tag{14}$$

where, $nd_{1ave}$ is an average of refractive indices to the d-line of lens elements constituting the first lens unit, and $nd_{3ave}$ is an average of refractive indices to the d-line of lens elements constituting the third lens unit.

The condition (12) sets forth the average of the refractive indices of two lens elements constituting the first lens unit. The condition (14) sets forth the average of the refractive indices of three lens elements constituting the third lens unit. When the condition (12) is satisfied, the first lens unit can obtain strong refractive power. As a result, the size of the entire lens system can be reduced. Although it becomes difficult to compensate curvature of field when the condition (12) is satisfied, suitable compensation can be realized by satisfying the condition (14).

In a zoom lens system having the basic configuration like the zoom lens systems according to Embodiments 1 to 9, it is preferable that the following conditions (13) and (14) are simultaneously satisfied.

$$nd_{2ave} > 1.885 \tag{13}$$

$$nd_{3ave} > 1.830 \tag{14}$$

where, $nd_{2ave}$ is an average of refractive indices to the d-line of lens elements constituting the second lens unit, and $nd_{3ave}$ is an average of refractive indices to the d-line of lens elements constituting the third lens unit.

The condition (13) sets forth the average of the refractive indices of two lens elements constituting the second lens unit. The condition (14) sets forth the average of the refractive indices of three lens elements constituting the third lens unit. When the condition (13) is satisfied, the second lens unit can obtain strong refractive power. As a result, the size of the entire lens system can be reduced. Although it becomes difficult to compensate curvature of field and coma aberration when the condition (13) is satisfied, suitable compensation can be realized by satisfying the condition (14).

Each of the lens units constituting the zoom lens system according to any of Embodiments 1 to 9 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in the refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 10

Figure 25:
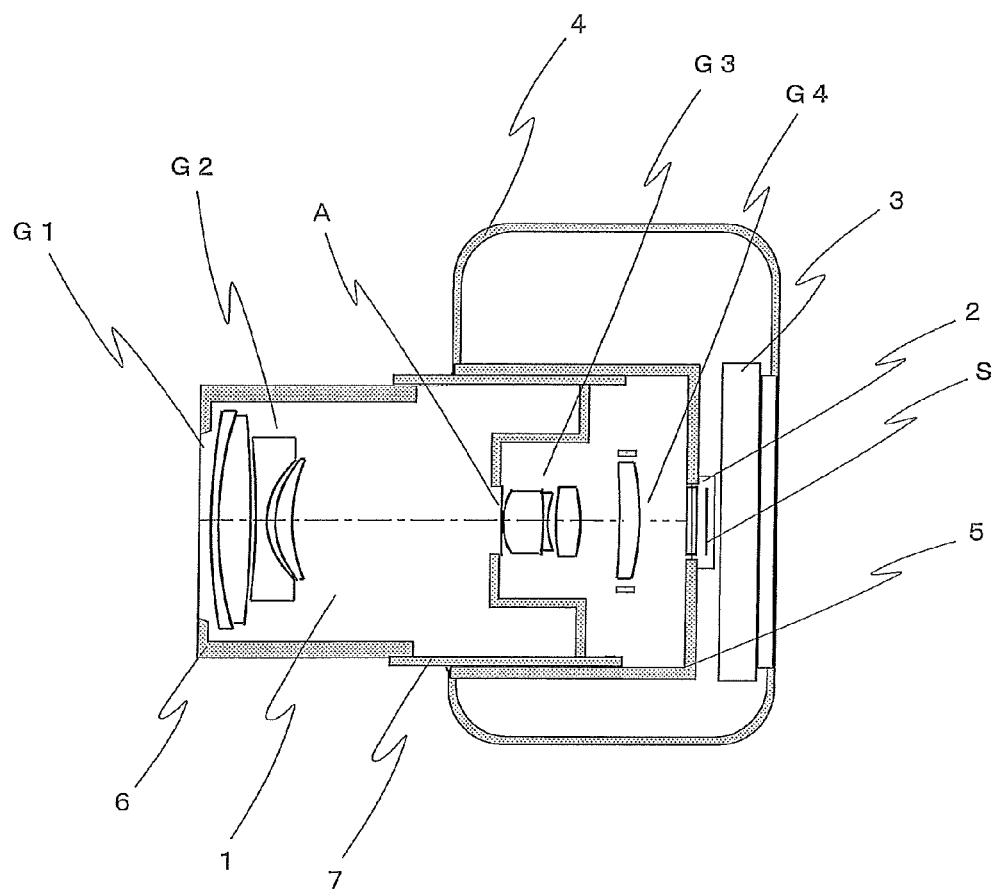
FIG. 25 is a schematic construction diagram of a digital still camera according to Embodiment 10.

FIG. 25 is a schematic construction diagram of a digital still camera according to Embodiment 10. In FIG. 25, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 25, the zoom lens system 1 comprises a first lens unit G1, a second lens unit G2, an aperture diaphragm A, a third lens unit G3, and a fourth lens unit G4. In the body 4, the zoom lens system 1 is arranged on the front side, and the image sensor 2 is arranged on the rear side of the zoom lens system 1. On the rear side of the body 4, the liquid crystal display monitor 3 is arranged, and an optical image of a photographic object generated by the zoom lens system 1 is formed on an image surface S.

A lens barrel comprises a main barrel 5, a moving barrel 6 and a cylindrical cam 7. When the cylindrical cam 7 is rotated, the first lens unit G1, the second lens unit G2, the aperture diaphragm A and the third lens unit G3, and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

In this way, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 25, any one of the zoom lens systems according to Embodiments 2 to 9 may be employed in place of the zoom lens system according to Embodiment 1. Further, the optical system of the digital still camera shown in FIG. 25 is applicable also to a digital video camera for moving images. In this case, moving images with high resolution can be acquired in addition to still images.

Here, the digital still camera according to Embodiment 10 has been described for a case that the employed zoom lens system 1 is a zoom lens system according to any of Embodiments 1 to 9. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 9.

Further, Embodiment 10 has been described for a case that the zoom lens system is applied to a lens barrel of so-called barrel retraction construction. However, the present invention is not limited to this. For example, the zoom lens system may be applied to a lens barrel of so-called bending construction where a prism having an internal reflective surface or a front surface reflective minor is arranged at an arbitrary position within the first lens unit G1 or the like. Further, in Embodiment 10, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of retraction.

Further, an imaging device comprising a zoom lens system according to any of Embodiments 1 to 9 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments 1 to 9 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + A4h^4 + A6h^6 + A8h^8 + A10h^{10}$$

Here, κ is the conic constant, A4, A6, A8 and A10 are a fourth-order, sixth-order, eighth-order and tenth-order aspherical coefficients, respectively.

FIGS. 2, 4, 7, 10, 13, 16, 19, 21 and 24 are longitudinal aberration diagrams of the zoom lens systems according to Embodiments 1 to 9, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 5, 8, 11, 14, 17 and 22 are lateral aberration diagrams of the zoom lens systems at a telephoto limit according to Embodiments 2, 3, 4, 5, 6 and 8, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the third lens unit G3 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the third lens unit G3 in a direction perpendicular to the optical axis in the image blur compensation state at a telephoto limit is as follows.

| Example | Amount of movement (mm) |
|---|---|
| 2 | 0.066 |
| 3 | 0.065 |
| 4 | 0.085 |
| 5 | 0.164 |
| 6 | 0.162 |
| 8 | 0.126 |

Here, when the shooting distance is infinity, at a telephoto limit, the amount of image decentering in a case that the zoom lens system inclines by 0.3° is equal to the amount of image decentering in a case that the entirety of the third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 53.88697 | 0.70000 | 2.14422 | 17.5 |
| 2 | 33.61269 | 2.70000 | 1.88300 | 40.8 |
| 3* | −78.62344 | Variable | | |
| 4* | −29.61440 | 0.90000 | 1.85976 | 40.6 |
| 5* | 5.38671 | 0.96970 | | |
| 6 | 7.60867 | 1.70000 | 2.00170 | 20.6 |
| 7 | 17.83321 | Variable | | |
| 8 (Diaphragm) | ∞ | 0.00000 | | |
| 9* | 4.83218 | 2.50000 | 1.85976 | 40.6 |
| 10 | −20.78204 | 0.40000 | 1.84666 | 23.8 |
| 11 | 4.18088 | 0.60000 | | |
| 12 | 23.22285 | 1.70000 | 1.88300 | 40.8 |
| 13 | −15.27630 | Variable | | |
| 14* | −136.73890 | 1.80000 | 1.80420 | 46.5 |
| 15 | −15.17350 | Variable | | |
| 16 | ∞ | 1.00000 | 1.51680 | 64.2 |
| 17 | ∞ | (BF) | | |
| Image surface | ∞ | | | |

TABLE 2

(Aspherical data)

Surface No. 3

K = 0.00000E+00, A4 = 9.46580E−06, A6 = 9.24959E−08,
A8 = −1.94161E−09 A10 = 1.28468E−11

Surface No. 4

K = 0.00000E+00, A4 = 1.90757E−04, A6 = −2.48139E−06,
A8 = 2.09358E−08 A10 = −1.46592E−10

Surface No. 5

K = −3.89389E+00, A4 = 2.60950E−03, A6 = −6.64984E−05,
A8 = 1.90753E−06 A10 = −2.68626E−08

Surface No. 9

K = −3.22756E−01, A4 = −2.20274E−04, A6 = 5.00961E−06,
A8 = −3.55501E−07 A10 = 2.49143E−07

Surface No. 14

K = 0.00000E+00, A4 = −1.11027E−04, A6 = 2.59208E−05,
A8 = −1.40393E−06 A10 = 3.02037E−08

TABLE 3

(Various data)

Zooming ratio 4.71881

| | Wide-angle limit | Middle position | Telephoto limit |
|---|---|---|---|
| Focal length | 5.1431 | 11.1843 | 24.2692 |
| F-number | 3.29015 | 4.01644 | 5.64694 |
| View angle | 39.7157 | 18.5745 | 9.0447 |
| Image height | 3.8300 | 3.8300 | 3.8300 |
| Overall length of lens system | 37.7132 | 39.2444 | 46.7393 |
| BF | 0.50614 | 0.49010 | 0.49206 |
| d3 | 0.5000 | 7.4045 | 13.6271 |
| d7 | 14.3643 | 5.4342 | 1.4500 |
| d13 | 1.9500 | 5.0840 | 13.7078 |
| d15 | 5.4231 | 5.8620 | 2.4927 |
| Entrance pupil position | 10.3093 | 19.3769 | 31.0347 |
| Exit pupil position | −15.2175 | −23.9137 | −135.6330 |
| Front principal points position | 13.7701 | 25.4354 | 50.9771 |
| Back principal points position | 32.5701 | 28.0602 | 22.4701 |

TABLE 3-continued (Various data)

Single lens data

| Lens element | Initial surface number | Focal length |
|---|---|---|
| 1 | 1 | −79.5444 |
| 2 | 2 | 26.9705 |
| 3 | 4 | −5.2388 |
| 4 | 6 | 12.2305 |
| 5 | 9 | 4.7756 |
| 6 | 10 | −4.0810 |
| 7 | 12 | 10.6564 |
| 8 | 14 | 21.0837 |

Zoom lens unit data

| Lens unit | Initial surface No. | Focal length | Overall length of lens unit | Front principal points position | Back principal points position |
|---|---|---|---|---|---|
| 1 | 1 | 40.89749 | 3.40000 | 0.70645 | 2.32389 |
| 2 | 4 | −9.80946 | 3.56970 | 0.03582 | 1.34116 |
| 3 | 8 | 10.36947 | 5.20000 | −0.27027 | 1.56787 |
| 4 | 14 | 21.08371 | 1.80000 | 1.11484 | 1.92371 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.33279 | −0.43459 | −0.60000 |
| 3 | 8 | −0.54499 | −0.93456 | −1.18725 |
| 4 | 14 | 0.69337 | 0.67332 | 0.83303 |

Numerical Example 2

The zoom lens system of Numerical Example 2 corresponds to Embodiment 2 shown in FIG. 3. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 77.48544 | 0.70000 | 2.14422 | 17.5 |
| 2 | 42.37542 | 2.50000 | 1.88300 | 40.8 |
| 3* | −54.64303 | Variable | | |
| 4* | −24.97959 | 0.90000 | 1.85976 | 40.6 |
| 5* | 5.48270 | 0.96780 | | |
| 6 | 7.81948 | 1.70000 | 2.00170 | 20.6 |
| 7 | 20.38775 | Variable | | |
| 8 (Diaphragm) | ∞ | 0.00000 | | |
| 9* | 4.85241 | 2.50000 | 1.85976 | 40.6 |
| 10 | −19.04782 | 0.40000 | 1.84666 | 23.8 |
| 11 | 4.26231 | 0.60000 | | |
| 12 | 37.18501 | 1.50000 | 1.88300 | 40.8 |
| 13 | −13.66920 | Variable | | |
| 14* | −136.73890 | 1.80000 | 1.80420 | 46.5 |
| 15 | −14.90167 | Variable | | |
| 16 | ∞ | 1.00000 | 1.51680 | 64.2 |
| 17 | ∞ | (BF) | | |
| Image surface | ∞ | | | |

TABLE 5

(Aspherical data)

Surface No. 3

K = 0.00000E+00, A4 = 1.47762E−05, A6 = 5.09518E−08,
A8 = −1.94970E−09 A10 = 1.59565E−11

Surface No. 4

K = 0.00000E+00, A4 = 2.31527E−04, A6 = −2.90013E−06,
A8 = 1.68839E−08 A10 = −5.66432E−11

Surface No. 5

K = −3.52458E+00, A4 = 2.23158E−03, A6 = −4.53310E−05,
A8 = 1.14427E−06 A10 = −1.66385E−08

Surface No. 9

K = −3.07449E−01, A4 = −2.44430E−04, A6 = −4.77575E−06,
A8 = 7.41211E−07 A10 = 2.49143E−07

Surface No. 14

K = 0.00000E+00, A4 = −6.50732E−05, A6 = 1.34430E−05,
A8 = −7.09989E−07 A10 = 1.38939E−08

TABLE 6

(Various data)

Zooming ratio 4.71152

| | Wide-angle limit | Middle position | Telephoto limit |
|---|---|---|---|
| Focal length | 5.1466 | 11.1810 | 24.2483 |
| F-number | 3.33816 | 4.20129 | 6.20279 |
| View angle | 39.6377 | 18.5711 | 9.0207 |
| Image height | 3.8300 | 3.8300 | 3.8300 |
| Overall length of lens system | 37.7216 | 39.2545 | 46.7249 |
| BF | 0.51113 | 0.48442 | 0.49197 |
| d3 | 0.5000 | 6.7559 | 11.8660 |
| d7 | 14.5217 | 5.5731 | 1.4500 |
| d13 | 1.9080 | 6.0145 | 15.8554 |
| d15 | 5.7131 | 5.8587 | 2.4937 |
| Entrance pupil position | 9.9785 | 17.5384 | 25.2778 |
| Exit pupil position | −15.2007 | −27.1412 | −894.2331 |
| Front principal points position | 13.4393 | 24.1941 | 48.8689 |
| Back principal points position | 32.5751 | 28.0734 | 22.4766 |

Single lens data

| Lens element | Initial surface number | Focal length |
|---|---|---|
| 1 | 1 | −82.6114 |
| 2 | 2 | 27.3598 |
| 3 | 4 | −5.1588 |
| 4 | 6 | 11.8601 |
| 5 | 9 | 4.7266 |
| 6 | 10 | −4.0816 |
| 7 | 12 | 11.4782 |
| 8 | 14 | 20.6601 |

| | | | Zoom lens unit data | | |
|---|---|---|---|---|---|
| Lens unit | Initial surface No. | Focal length | Overall length of lens unit | Front principal points position | Back principal points position |
| 1 | 1 | 40.76881 | 3.20000 | 1.00946 | 2.53622 |
| 2 | 4 | −9.96079 | 3.56780 | −0.07786 | 1.19845 |
| 3 | 8 | 10.69375 | 5.00000 | −0.39913 | 1.39101 |
| 4 | 14 | 20.66011 | 1.80000 | 1.11237 | 1.92123 |

| | | Magnification of zoom lens unit | | |
|---|---|---|---|---|
| Lens unit | Initial surface No. | Wide-angle limit | Middle position | Telephoto limit |
| 1 | 1 | 0.00000 | 0.00000 | 0.00000 |
| 2 | 4 | −0.33513 | −0.42447 | −0.54264 |
| 3 | 8 | −0.55997 | −0.96877 | −1.32146 |
| 4 | 14 | 0.67269 | 0.66693 | 0.82944 |

Numerical Example 3

The zoom lens system of Numerical Example 3 corresponds to Embodiment 3 shown in FIG. 6. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1 | 97.05992 | 0.70000 | 2.14422 | 17.5 |
| 2 | 46.46025 | 2.50000 | 1.88300 | 40.8 |
| 3* | −47.77710 | Variable | | |
| 4* | −22.51907 | 0.90000 | 1.85976 | 40.6 |
| 5* | 5.49697 | 0.96780 | | |
| 6 | 7.89898 | 1.70000 | 2.00170 | 20.6 |
| 7 | 21.79417 | Variable | | |
| 8 (Diaphragm) | ∞ | 0.00000 | | |
| 9* | 4.55112 | 2.50000 | 1.85976 | 40.6 |
| 10 | 21.65382 | 0.40000 | 2.00170 | 20.6 |
| 11 | 4.17957 | 0.60000 | | |
| 12 | 22.76037 | 1.50000 | 1.88300 | 40.8 |
| 13 | −13.19010 | Variable | | |
| 14* | −136.73890 | 1.80000 | 1.80420 | 46.5 |
| 15 | −15.86951 | Variable | | |
| 16 | ∞ | 1.00000 | 1.51680 | 64.2 |
| 17 | ∞ | (BF) | | |
| Image surface | ∞ | | | |

TABLE 8

(Aspherical data)

Surface No. 3

K = 0.00000E+00, A4 = 1.36523E−05, A6 = 9.09025E−08, A8 = −2.14561E−09 A10 = 1.60945E−11
Surface No. 4

K = 0.00000E+00, A4 = 2.88191E−04, A6 = −4.57427E−06, A8 = 4.34209E−08 A10 = −2.20674E−10
Surface No. 5

K = −3.39371E+00, A4 = 2.17647E−03, A6 = −4.18815E−05, A8 = 9.46075E−07 A10 = −1.34979E−08

TABLE 8-continued (Aspherical data)

Surface No. 9

K = −2.88099E−01, A4 = −2.38380E−04, A6 = −5.03439E−06, A8 = 6.92510E−07 A10 = 2.49143E−07
Surface No. 14

K = 0.00000E+00, A4 = −3.29945E−05, A6 = 1.29659E−05, A8 = −6.41813E−07 A10 = 1.26725E−08

TABLE 9

(Various data)

Zooming ratio 4.71468

| | Wide-angle limit | Middle position | Telephoto limit |
|---|---|---|---|
| Focal length | 5.1453 | 11.1795 | 24.2583 |
| F-number | 3.39777 | 4.28927 | 6.21311 |
| View angle | 39.6513 | 18.5719 | 9.0119 |
| Image height | 3.8300 | 3.8300 | 3.8300 |
| Overall length of lens system | 37.7137 | 39.1679 | 46.7282 |
| BF | 0.50696 | 0.48248 | 0.49531 |
| d3 | 0.5000 | 6.6971 | 12.2770 |
| d7 | 14.5410 | 5.6054 | 1.4500 |
| d13 | 1.8762 | 5.9504 | 15.4550 |
| d15 | 5.7217 | 5.8647 | 2.4832 |
| Entrance pupil position | 9.7713 | 17.1562 | 25.9486 |
| Exit pupil position | −14.9074 | −25.6276 | −188.1820 |
| Front principal points position | 13.1991 | 23.5490 | 47.0880 |
| Back principal points position | 32.5684 | 27.9884 | 22.4699 |

Single lens data

| Lens element | Initial surface number | Focal length |
|---|---|---|
| 1 | 1 | −78.4663 |
| 2 | 2 | 27.0118 |
| 3 | 4 | −5.0639 |
| 4 | 6 | 11.6547 |
| 5 | 9 | 6.2779 |
| 6 | 10 | −5.2304 |
| 7 | 12 | 9.6459 |
| 8 | 14 | 22.1770 |

Zoom lens unit data

| Lens unit | Initial surface No. | Focal length | Overall length of lens unit | Front principal points position | Back principal points position |
|---|---|---|---|---|---|
| 1 | 1 | 40.90528 | 3.20000 | 1.17728 | 2.70651 |
| 2 | 4 | −9.86216 | 3.56780 | −0.12987 | 1.13155 |
| 3 | 8 | 10.54809 | 5.00000 | −0.46117 | 1.32934 |
| 4 | 14 | 22.17696 | 1.80000 | 1.12122 | 1.93013 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.32678 | −0.41123 | −0.53591 |

-continued

| | | | | |
|---|---|---|---|---|
| 3 | 8 | −0.55362 | −0.96329 | −1.31450 |
| 4 | 14 | 0.69528 | 0.68993 | 0.84183 |

Numerical Example 4

The zoom lens system of Numerical Example 4 corresponds to Embodiment 4 shown in FIG. 9. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 28.71329 | 0.70000 | 2.00170 | 20.6 |
| 2 | 19.42508 | 2.80000 | 1.76802 | 49.2 |
| 3* | −115.20360 | Variable | | |
| 4* | −21.87243 | 0.90000 | 1.85976 | 40.6 |
| 5* | 5.39818 | 0.92440 | | |
| 6 | 7.35762 | 1.70000 | 1.94595 | 18.0 |
| 7 | 16.90012 | Variable | | |
| 8 (Diaphragm) | ∞ | 0.00000 | | |
| 9* | 4.55090 | 2.00000 | 1.85976 | 40.6 |
| 10 | 32.15726 | 0.75000 | 1.92286 | 20.9 |
| 11 | 4.10556 | 0.65000 | | |
| 12 | 28.55014 | 1.70000 | 1.88300 | 40.8 |
| 13 | −13.03525 | Variable | | |
| 14* | −56.93994 | 1.75000 | 1.77377 | 47.2 |
| 15 | −11.83795 | Variable | | |
| 16 | ∞ | 1.00000 | 1.51680 | 64.2 |
| 17 | ∞ | (BF) | | |
| Image surface | ∞ | | | |

TABLE 11

(Aspherical data)

Surface No. 3

K = 0.00000E+00, A4 = 8.25518E−06, A6 = 8.05537E−08,
A8 = −1.83404E−09 A10 = 1.36190E−11

Surface No. 4

K = 0.00000E+00, A4 = 3.76370E−04, A6 = −5.54490E−06,
A8 = 4.02068E−08 A10 = −8.60389E−11

Surface No. 5

K = −3.69163E+00, A4 = 2.59884E−03, A6 = −5.44387E−05,
A8 = 1.45475E−06 A10 = −2.17379E−08

Surface No. 9

K = −4.14883E−01, A4 = −9.21666E−05, A6 = −2.91362E−07,
A8 = 1.60430E−06 A10 = 2.49143E−07

Surface No. 14

K = 0.00000E+00, A4 = −1.24204E−04, A6 = 2.14219E−05,
A8 = −1.13415E−06 A10 = 2.25228E−08

TABLE 12

(Various data)

Zooming ratio 5.65625

| | Wide-angle limit | Middle position | Telephoto limit |
|---|---|---|---|
| Focal length | 5.1459 | 12.2513 | 29.1062 |
| F-number | 3.30007 | 4.13787 | 5.63730 |
| View angle | 39.6542 | 17.0649 | 7.5694 |
| Image height | 3.8300 | 3.8300 | 3.8300 |
| Overall length of lens system | 37.3809 | 39.5083 | 47.4075 |
| BF | 0.51436 | 0.48968 | 0.49235 |
| d3 | 0.5000 | 6.8693 | 13.9472 |
| d7 | 13.6634 | 4.9010 | 1.4500 |
| d13 | 2.0228 | 5.9040 | 14.0872 |
| d15 | 5.8060 | 6.4698 | 2.5563 |
| Entrance pupil position | 10.4667 | 20.0406 | 39.5259 |
| Exit pupil position | −16.4143 | −30.4506 | −1223.4949 |
| Front principal points position | 14.0484 | 27.4408 | 67.9400 |
| Back principal points position | 32.2350 | 27.2570 | 18.3013 |

Single lens data

| Lens element | Initial surface number | Focal length |
|---|---|---|
| 1 | 1 | −62.2976 |
| 2 | 2 | 21.8405 |
| 3 | 4 | −4.9602 |
| 4 | 6 | 12.6774 |
| 5 | 9 | 5.9660 |
| 6 | 10 | −5.1661 |
| 7 | 12 | 10.3331 |
| 8 | 14 | 18.9932 |

Zoom lens unit data

| Lens unit | Initial surface No. | Focal length | Overall length of lens unit | Front principal points position | Back principal points position |
|---|---|---|---|---|---|
| 1 | 1 | 34.07693 | 3.50000 | 0.29738 | 1.84285 |
| 2 | 4 | −8.59236 | 3.52440 | 0.11198 | 1.40959 |
| 3 | 8 | 10.58063 | 5.10000 | −0.21934 | 1.49499 |
| 4 | 14 | 18.99322 | 1.75000 | 1.22482 | 2.00464 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.37011 | −0.51005 | −0.87962 |
| 3 | 8 | −0.63165 | −1.15123 | −1.18680 |
| 4 | 14 | 0.64593 | 0.61228 | 0.81818 |

Numerical Example 5

The zoom lens system of Numerical Example 5 corresponds to Embodiment 5 shown in FIG. 12. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 23.92026 | 0.80000 | 2.00170 | 20.6 |
| 2 | 17.23850 | 2.50000 | 1.80420 | 46.5 |
| 3* | 91.93466 | Variable | | |
| 4* | −86.26322 | 1.00000 | 1.85976 | 40.6 |
| 5* | 5.30963 | 1.09570 | | |
| 6 | 7.43523 | 1.70000 | 2.00170 | 20.6 |
| 7 | 14.35270 | Variable | | |
| 8 (Diaphragm) | ∞ | 0.00000 | | |
| 9* | 4.78659 | 2.10000 | 1.77377 | 47.2 |
| 10 | 10.28002 | 0.80000 | 1.92286 | 20.9 |
| 11 | 4.30394 | 0.50000 | | |
| 12 | 11.80608 | 1.50000 | 1.80420 | 46.5 |
| 13 | −41.97623 | Variable | | |
| 14* | 18.23360 | 1.80000 | 1.80420 | 46.5 |
| 15 | 449.20610 | Variable | | |
| 16 | ∞ | 1.00000 | 1.51680 | 64.2 |
| 17 | ∞ | (BF) | | |
| Image surface | ∞ | | | |

TABLE 14

(Aspherical data)

Surface No. 3

K = 0.00000E+00, A4 = 1.16573E−06, A6 = 3.73564E−10,
A8 = 0.00000E+00 A10 = 0.00000E+00

Surface No. 4

K = 0.00000E+00, A4 = 4.11218E−05, A6 = 4.14113E−07,
A8 = 0.00000E+00 A10 = 0.00000E+00

Surface No. 5

K = −2.55557E+00, A4 = 1.78988E−03, A6 = −2.05242E−05,
A8 = 4.89013E−07 A10 = 9.76558E−10

Surface No. 9

K = −4.57612E−01, A4 = 8.64666E−05, A6 = 3.31418E−05,
A8 = −6.94709E−06 A10 = 6.20715E−07

Surface No. 14

K = 0.00000E+00, A4 = 3.07143E−05, A6 = 2.65662E−06,
A8 = 0.00000E+00 A10 = 0.00000E+00

TABLE 15

(Various data)

Zooming ratio 6.54154

| | Wide-angle limit | Middle position | Telephoto limit |
|---|---|---|---|
| Focal length | 6.7983 | 17.3298 | 44.4713 |
| F-number | 3.35579 | 3.99862 | 4.53813 |
| View angle | 32.0536 | 12.6171 | 4.8991 |
| Image height | 3.8300 | 3.8300 | 3.8300 |
| Overall length of lens system | 40.9465 | 44.9233 | 56.8471 |
| BF | 0.50091 | 0.52914 | 0.50678 |
| d3 | 0.6000 | 11.6273 | 24.8265 |
| d7 | 15.2623 | 4.7479 | 1.4500 |
| d13 | 2.5571 | 3.4896 | 12.7618 |
| d15 | 7.2306 | 9.7337 | 2.5063 |
| Entrance pupil position | 12.0260 | 31.2012 | 94.2363 |
| Exit pupil position | −15.9753 | −20.1365 | −50.5394 |
| Front principal points position | 16.0192 | 33.9985 | 99.9644 |
| Back principal points position | 34.1483 | 27.5935 | 12.3759 |

Single lens data

| Lens element | Initial surface number | Focal length |
|---|---|---|
| 1 | 1 | −65.5343 |
| 2 | 2 | 25.9947 |
| 3 | 4 | −5.7884 |
| 4 | 6 | 13.7142 |
| 5 | 9 | 9.9217 |
| 6 | 10 | −8.5733 |
| 7 | 12 | 11.6022 |
| 8 | 14 | 23.5883 |

Zoom lens unit data

| Lens unit | Initial surface No. | Focal length | Overall length of lens unit | Front principal points position | Back principal points position |
|---|---|---|---|---|---|
| 1 | 1 | 44.68006 | 3.30000 | −0.90484 | 0.65703 |
| 2 | 4 | −10.42881 | 3.79570 | 0.26532 | 1.66111 |
| 3 | 8 | 12.81592 | 4.90000 | −1.39579 | 0.73000 |
| 4 | 14 | 23.58831 | 1.80000 | −0.04213 | 0.76205 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.33923 | −0.52896 | −1.60039 |
| 3 | 8 | −0.74721 | −1.48745 | −0.77711 |
| 4 | 14 | 0.60028 | 0.49297 | 0.80031 |

Numerical Example 6

The zoom lens system of Numerical Example 6 corresponds to Embodiment 6 shown in FIG. 15. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 21.11164 | 0.80000 | 2.00170 | 20.6 |
| 2 | 15.12358 | 2.50000 | 1.80420 | 46.5 |
| 3* | 88.24478 | Variable | | |
| 4* | −69.21321 | 1.00000 | 1.85976 | 40.6 |
| 5* | 4.93236 | 1.09570 | | |
| 6 | 7.22589 | 1.70000 | 2.00170 | 20.6 |
| 7 | 14.35270 | Variable | | |
| 8 (Diaphragm) | ∞ | 0.00000 | | |
| 9* | 4.94313 | 2.10000 | 1.77377 | 47.2 |
| 10 | 10.82877 | 0.80000 | 1.92286 | 20.9 |
| 11 | 4.47121 | 0.50000 | | |
| 12 | 11.90782 | 1.50000 | 1.80420 | 46.5 |
| 13 | −39.79054 | Variable | | |
| 14* | 20.42889 | 1.80000 | 1.80420 | 46.5 |
| 15 | −248.53400 | Variable | | |

TABLE 16-continued (Surface data)

| Surface number | r | d | nd | vd |
|---|---|---|---|---|
| 16 | ∞ | 1.00000 | 1.51680 | 64.2 |
| 17 | ∞ | (BF) | | |
| Image surface | ∞ | | | |

TABLE 17

(Aspherical data)

Surface No. 3

K = 0.00000E+00, A4 = 2.27928E−06, A6 = 3.00081E−10,
A8 = 0.00000E+00, A10 = 0.00000E+00

Surface No. 4

K = 0.00000E+00, A4 = 5.20294E−05, A6 = −4.16769E−08,
A8 = 0.00000E+00, A10 = 0.00000E+00

Surface No. 5

K = −2.47053E+00, A4 = 2.06679E−03, A6 = −2.74077E−05,
A8 = 6.95651E−07, A10 = −4.23395E−09

Surface No. 9

K = −4.61701E−01, A4 = 8.60229E−05, A6 = 2.31646E−05,
A8 = −4.52966E−06, A10 = 4.13883E−07

Surface No. 14

K = 0.00000E+00, A4 = 2.57276E−05, A6 = 3.06354E−06,
A8 = 0.00000E+00, A10 = 0.00000E+00

TABLE 18

(Various data)

Zooming ratio 6.54191

| | Wide-angle limit | Middle position | Telephoto limit |
|---|---|---|---|
| Focal length | 6.7983 | 17.3294 | 44.4739 |
| F-number | 3.40234 | 3.91077 | 4.59471 |
| View angle | 32.0530 | 12.6173 | 4.9207 |
| Image height | 3.8300 | 3.8300 | 3.8300 |
| Overall length of lens system | 40.8782 | 44.9165 | 53.2755 |
| BF | 0.50271 | 0.52741 | 0.50364 |
| d3 | 0.6000 | 11.2009 | 20.8199 |
| d7 | 14.7539 | 5.4351 | 1.4500 |
| d13 | 2.5571 | 3.2145 | 13.2000 |
| d15 | 7.6688 | 9.7429 | 2.5063 |
| Entrance pupil position | 11.7579 | 33.9417 | 82.6375 |
| Exit pupil position | −16.5435 | −19.7880 | −56.1280 |
| Front principal points position | 15.8449 | 36.4888 | 92.1852 |
| Back principal points position | 34.0799 | 27.5871 | 8.8016 |

Single lens data

| Lens element | Initial surface number | Focal length |
|---|---|---|
| 1 | 1 | −57.0431 |
| 2 | 2 | 22.3546 |
| 3 | 4 | −5.3221 |
| 4 | 6 | 12.9783 |
| 5 | 9 | 10.1707 |
| 6 | 10 | −8.7828 |
| 7 | 12 | 11.5458 |
| 8 | 14 | 23.5435 |

Zoom lens unit data

| Lens unit | Initial surface No. | Focal length | Overall length of lens unit | Front principal points position | Back principal points position |
|---|---|---|---|---|---|
| 1 | 1 | 38.26554 | 3.30000 | −0.82482 | 0.73786 |
| 2 | 4 | −9.46936 | 3.79570 | 0.23471 | 1.62366 |
| 3 | 8 | 12.87340 | 4.90000 | −1.23135 | 0.84238 |
| 4 | 14 | 23.54354 | 1.80000 | 0.07600 | 0.87535 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.37282 | −0.63989 | −1.82826 |
| 3 | 8 | −0.81370 | −1.42546 | −0.78982 |
| 4 | 14 | 0.58564 | 0.49650 | 0.80488 |

Numerical Example 7

The zoom lens system of Numerical Example 7 corresponds to Embodiment 7 shown in FIG. 18. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 24.63915 | 0.80000 | 1.92286 | 20.9 |
| 2 | 17.69162 | 2.90000 | 1.77250 | 49.6 |
| 3 | 141.43600 | Variable | | |
| 4* | −74.12426 | 0.95000 | 1.85976 | 40.6 |
| 5* | 5.96172 | 1.39660 | | |
| 6 | 8.26210 | 1.70000 | 2.14422 | 17.5 |
| 7 | 12.83109 | Variable | | |
| 8(Diaphragm) | ∞ | 0.00000 | | |
| 9* | 4.65521 | 2.50090 | 1.80139 | 45.4 |
| 10 | 11.21394 | 0.50000 | 1.92286 | 20.9 |
| 11 | 4.06867 | 0.50000 | | |
| 12 | 11.22865 | 1.50000 | 1.80420 | 46.5 |
| 13 | −68.81526 | Variable | | |
| 14* | 15.96294 | 1.70000 | 1.80610 | 40.7 |
| 15 | −270.01270 | Variable | | |
| 16 | ∞ | 1.00000 | 1.51680 | 64.2 |
| 17 | ∞ | (BF) | | |
| Image surface | ∞ | | | |

TABLE 20

(Aspherical data)

Surface No. 4

K = 0.00000E+00, A4 = 3.83404E−05, A6 = 5.29405E−08,
A8 = 1.02032E−09, A10 = 0.00000E+00

Surface No. 5

K = −3.21567E+00, A4 = 1.68391E−03, A6 = −3.06050E−05,
A8 = 7.28861E−07, A10 = −5.38787E−09

Surface No. 9

K = −3.45514E−01, A4 = −2.07950E−05, A6 = 2.45075E−05,
A8 = −6.29992E−06, A10 = 6.15382E−07

TABLE 20-continued (Aspherical data)

Surface No. 14

K = 0.00000E+00, A4 = 5.07793E−05, A6 = 3.47763E−07,
A8 = 0.00000E+00, A10 = 0.00000E+00

TABLE 21

(Various data)

Zooming ratio 6.54156

|  | Wide-angle limit | Middle position | Telephoto limit |
|---|---|---|---|
| Focal length | 6.4574 | 16.4623 | 42.2414 |
| F-number | 3.43301 | 3.85000 | 5.93349 |
| View angle | 33.6879 | 13.1888 | 5.1236 |
| Image height | 3.8300 | 3.8300 | 3.8300 |
| Overall length of lens system | 43.0231 | 45.0104 | 57.0342 |
| BF | 0.49458 | 0.54184 | 0.50628 |
| d3 | 0.5000 | 11.6929 | 18.6778 |
| d7 | 16.7547 | 5.2707 | 1.4500 |
| d13 | 3.9231 | 3.9579 | 18.3061 |
| d15 | 5.9032 | 8.0996 | 2.6465 |
| Entrance pupil position | 12.9125 | 34.3781 | 57.9941 |
| Exit pupil position | −18.2489 | −20.5320 | 155.8859 |
| Front principal points position | 17.1452 | 37.9805 | 111.7193 |
| Back principal points position | 36.5657 | 28.5482 | 14.7928 |

Single lens data

| Lens element | Initial surface number | Focal length |
|---|---|---|
| 1 | 1 | −71.9643 |
| 2 | 2 | 25.9114 |
| 3 | 4 | −6.3830 |
| 4 | 6 | 16.9188 |
| 5 | 9 | 8.4915 |
| 6 | 10 | −7.1597 |
| 7 | 12 | 12.1049 |
| 8 | 14 | 18.7469 |

Zoom lens unit data

| Lens unit | Initial surface No. | Focal length | Overall length of lens unit | Front principal points position | Back principal points position |
|---|---|---|---|---|---|
| 1 | 1 | 41.71577 | 3.70000 | −0.61640 | 1.06461 |
| 2 | 4 | −10.48715 | 4.04660 | 0.32254 | 1.79750 |
| 3 | 8 | 13.07665 | 5.00090 | −1.99839 | 0.39268 |
| 4 | 14 | 18.74694 | 1.70000 | 0.05268 | 0.80892 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.37763 | −0.63260 | −1.09323 |
| 3 | 8 | −0.71161 | −1.36698 | −1.23644 |
| 4 | 14 | 0.57603 | 0.45635 | 0.74913 |

Numerical Example 8

The zoom lens system of Numerical Example 8 corresponds to Embodiment 8 shown in FIG. 20. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ |  |  |  |
| 1 | 22.31477 | 0.70000 | 2.00069 | 25.5 |
| 2 | 15.00954 | 3.00000 | 1.77250 | 49.6 |
| 3 | 134.00890 | Variable |  |  |
| 4* | −74.12426 | 0.95000 | 1.85976 | 40.6 |
| 5* | 5.74093 | 1.47460 |  |  |
| 6 | 8.22686 | 1.70000 | 2.14422 | 17.5 |
| 7 | 12.83109 | Variable |  |  |
| 8(Diaphragm) | ∞ | 0.00000 |  |  |
| 9* | 4.91431 | 2.60000 | 1.80139 | 45.4 |
| 10 | 12.75399 | 0.50000 | 1.92286 | 20.9 |
| 11 | 4.33893 | 0.50000 |  |  |
| 12 | 11.87953 | 1.50000 | 1.80420 | 46.5 |
| 13 | −41.92985 | Variable |  |  |
| 14* | 18.47420 | 1.70000 | 1.80610 | 40.7 |
| 15 | −157.53940 | Variable |  |  |
| 16 | ∞ | 1.00000 | 1.51680 | 64.2 |
| 17 | ∞ | (BF) |  |  |
| Image surface | ∞ |  |  |  |

TABLE 23

(Aspherical data)

Surface No. 4

K = 0.00000E+00, A4 = −8.74359E−06, A6 = 1.89171E−06,
A8 = −3.03762E−08, A10 = 2.29230E−10
Surface No. 5

K = −2.22889E+00, A4 = 1.15130E−03, A6 = −6.72930E−06,
A8 = 1.43705E−07, A10 = 1.84035E−09
Surface No. 9

K = −3.26605E−01, A4 = −5.39200E−05, A6 = 2.26478E−05,
A8 = −6.40369E−06, A10 = 6.22390E−07
Surface No. 14

K = 0.00000E+00, A4 = 4.98088E−05, A6 = 5.35934E−07,
A8 = 0.00000E+00, A10 = 0.00000E+00

TABLE 24

(Various data)

Zooming ratio 6.54247

|  | Wide-angle limit | Middle position | Telephoto limit |
|---|---|---|---|
| Focal length | 6.4574 | 16.4608 | 42.2472 |
| F-number | 3.48441 | 4.02826 | 6.00338 |
| View angle | 33.6859 | 13.2167 | 5.1448 |
| Image height | 3.8300 | 3.8300 | 3.8300 |
| Overall length of lens system | 43.0119 | 44.9907 | 57.0202 |
| BF | 0.49741 | 0.53833 | 0.50380 |
| d3 | 0.5000 | 10.6480 | 18.2636 |
| d7 | 16.3104 | 5.0694 | 1.4500 |
| d13 | 3.9153 | 4.5004 | 18.5216 |
| d15 | 6.1642 | 8.6099 | 2.6566 |

TABLE 24-continued (Various data)

|  | | | |
|---|---|---|---|
| Entrance pupil position | 12.5843 | 31.2079 | 57.6490 |
| Exit pupil position | −18.2906 | −22.1408 | 435.3773 |
| Front principal points position | 16.8223 | 35.7212 | 104.0005 |
| Back principal points position | 36.5545 | 28.5299 | 14.7730 |

Single lens data

| Lens element | Initial surface number | Focal length |
|---|---|---|
| 1 | 1 | −48.1232 |
| 2 | 2 | 21.6427 |
| 3 | 4 | −6.1635 |
| 4 | 6 | 16.7389 |
| 5 | 9 | 8.6936 |
| 6 | 10 | −7.3350 |
| 7 | 12 | 11.6555 |
| 8 | 14 | 20.6012 |

Zoom lens unit data

| Lens unit | Initial surface No. | Focal length | Overall length of lens unit | Front principal points position | Back principal points position |
|---|---|---|---|---|---|
| 1 | 1 | 40.82102 | 3.70000 | −0.69986 | 0.99510 |
| 2 | 4 | −10.06756 | 4.12460 | 0.27444 | 1.74360 |
| 3 | 8 | 12.83074 | 5.10000 | −1.57358 | 0.70483 |
| 4 | 14 | 20.60124 | 1.70000 | 0.09922 | 0.85389 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.36912 | −0.58785 | −1.05857 |
| 3 | 8 | −0.71002 | −1.42062 | −1.26393 |
| 4 | 14 | 0.60357 | 0.48286 | 0.77352 |

Numerical Example 9

The zoom lens system of Numerical Example 9 corresponds to Embodiment 9 shown in FIG. 23. Table 25 shows the surface data of the zoom lens system of Numerical Example 9. Table 26 shows the aspherical data. Table 27 shows various data.

TABLE 25

(Surface data)

| Surface number | r | d | nd | vd |
|---|---|---|---|---|
| Object surface | ∞ | | | |
| 1 | 25.31390 | 0.80000 | 1.92286 | 20.9 |
| 2 | 18.37307 | 2.90000 | 1.77250 | 49.6 |
| 3 | 127.09120 | Variable | | |
| 4* | −72.33967 | 0.95000 | 1.85976 | 40.6 |
| 5* | 5.53361 | 1.50880 | | |
| 6 | 8.10144 | 1.70000 | 2.14422 | 17.5 |
| 7 | 12.83109 | Variable | | |
| 8(Diaphragm) | ∞ | 0.00000 | | |
| 9* | 4.58126 | 2.45000 | 1.80139 | 45.4 |

TABLE 25-continued (Surface data)

| Surface number | r | d | nd | vd |
|---|---|---|---|---|
| 10 | 12.89458 | 0.50000 | 1.92286 | 20.9 |
| 11 | 4.09435 | 0.48000 | | |
| 12 | 12.11282 | 1.50000 | 1.80420 | 46.5 |
| 13 | −29.99816 | Variable | | |
| 14* | 16.30826 | 1.70000 | 1.82080 | 42.7 |
| 15 | −204.49060 | Variable | | |
| 16 | ∞ | 1.00000 | 1.51680 | 64.2 |
| 17 | ∞ | (BF) | | |
| Image surface | ∞ | | | |

TABLE 26

(Aspherical data)

Surface No. 4

K = 0.00000E+00, A4 = 1.38654E−04, A6 = −2.03482E−06,
A8 = 1.30075E−08, A10 = 0.00000E+00
Surface No. 5

K = −2.38369E+00, A4 = 1.55078E−03, A6 = −1.46113E−05,
A8 = 2.67367E−07, A10 = −2.02236E−09
Surface No. 9

K = −4.10236E−01, A4 = 2.02270E−05, A6 = 2.52654E−05,
A8 = −7.12069E−06, A10 = 8.11753E−07
Surface No. 14

K = 0.00000E+00, A4 = 5.64788E−05, A6 = 4.75905E−07,
A8 = 0.00000E+00, A10 = 0.00000E+00

TABLE 27

(Various data)

Zooming ratio 6.54149

|  | Wide-angle limit | Middle position | Telephoto limit |
|---|---|---|---|
| Focal length | 5.5377 | 14.1127 | 36.2248 |
| F-number | 3.29490 | 3.84420 | 5.79699 |
| View angle | 37.8649 | 15.3659 | 5.9868 |
| Image height | 3.8300 | 3.8300 | 3.8300 |
| Overall length of lens system | 41.5403 | 44.0499 | 56.5476 |
| BF | 0.51202 | 0.52769 | 0.52473 |
| d3 | 0.5000 | 11.0956 | 19.1926 |
| d7 | 16.2704 | 5.0362 | 1.4500 |
| d13 | 3.8899 | 4.8390 | 17.2154 |
| d15 | 4.8791 | 7.0627 | 2.6761 |
| Entrance pupil position | 12.0360 | 30.5678 | 56.7404 |
| Exit pupil position | −17.3975 | −22.2119 | 209.0752 |
| Front principal points position | 15.8615 | 35.9218 | 99.2574 |
| Back principal points position | 36.0026 | 29.9372 | 20.3228 |

Single lens data

| Lens element | Initial surface number | Focal length |
|---|---|---|
| 1 | 1 | −76.8613 |
| 2 | 2 | 27.4838 |
| 3 | 4 | −5.9453 |
| 4 | 6 | 16.1170 |
| 5 | 9 | 7.8392 |
| 6 | 10 | −6.6830 |

TABLE 27-continued (Various data)

| 7 | 12 | 10.9026 |
| 8 | 14 | 18.4654 |

Zoom lens unit data

| Lens unit | Initial surface No. | Focal length | Overall length of lens unit | Front principal points position | Back principal points position |
|---|---|---|---|---|---|
| 1 | 1 | 44.06577 | 3.70000 | −0.70119 | 0.98430 |
| 2 | 4 | −9.81147 | 4.15880 | 0.22506 | 1.68504 |
| 3 | 8 | 11.74129 | 4.93000 | −1.33477 | 0.80049 |
| 4 | 14 | 18.46535 | 1.70000 | 0.06920 | 0.83229 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 4 | −0.31841 | −0.48529 | −0.80946 |
| 3 | 8 | −0.63113 | −1.30361 | −1.36507 |
| 4 | 14 | 0.62535 | 0.50625 | 0.74396 |

The following Table 28 shows the corresponding values to the individual conditions in the zoom lens systems of each of Numerical Examples. On Table 28, "nd" of the condition (1) shows the minimum value among the refractive indices of lens elements constituting the zoom lens system.

TABLE 28

(Values corresponding to conditions)

| | | Example | | | | | | | | |
|---|---|---|---|---|---|---|---|---|---|---|
| | Condition | 1 | 2 | 3 | 4 | 5 | 6 | 7 | 8 | 9 |
| (1) | nd | 1.804 | 1.804 | 1.804 | 1.768 | 1.774 | 1.774 | 1.773 | 1.773 | 1.773 |
| (a-1)(a-2) | $\omega_W$ | 39.73 | 39.66 | 39.66 | 39.68 | 32.05 | 32.06 | 33.68 | 33.68 | 37.88 |
| (b-1)(b-2) | $f_T/f_W$ | 4.72 | 4.71 | 4.71 | 5.66 | 6.54 | 6.54 | 6.54 | 6.54 | 6.54 |
| (5) | $nd_{2p}$ | 2.002 | 2.002 | 2.002 | 1.946 | 2.002 | 2.002 | 2.144 | 2.144 | 2.144 |
| (6) | $(r_{2na} + r_{2nb})/(r_{2na} - r_{2nb})$ | 0.69 | 0.64 | 0.61 | 0.60 | 0.88 | 0.87 | 0.85 | 0.86 | 0.86 |
| (7) | $(r_{2nb} + r_{2pa})/(r_{2nb} - r_{2pa})$ | −5.85 | −5.69 | −5.58 | −6.51 | −6.00 | −5.30 | −6.18 | −5.62 | −5.31 |
| (8) | $(r_{1pa} + r_{1pb})/(r_{1pa} - r_{1pb})$ | −0.40 | −0.13 | −0.01 | −0.71 | −1.46 | −1.41 | −1.29 | −1.25 | −1.34 |
| (9) | $f_3/f_W$ | 2.02 | 2.08 | 2.05 | 2.06 | 1.89 | 1.89 | 2.03 | 1.99 | 2.12 |
| (10) | $f_{3II}/f_3$ | 1.05 | 1.13 | 0.95 | 1.01 | 1.14 | 1.13 | 1.19 | 1.14 | 1.07 |
| (11) | $f_{3n}/f_3$ | −0.39 | −0.38 | −0.50 | −0.49 | −0.67 | −0.68 | −0.55 | −0.57 | −0.57 |
| (12) | $nd_{1ave}$ | 2.014 | 2.014 | 2.014 | 1.885 | 1.903 | 1.903 | 1.848 | 1.887 | 1.848 |
| (13) | $nd_{2ave}$ | 1.931 | 1.931 | 1.931 | 1.903 | 1.931 | 1.931 | 2.002 | 2.002 | 2.002 |
| (14) | $nd_{3ave}$ | 1.863 | 1.863 | 1.915 | 1.889 | 1.834 | 1.834 | 1.843 | 1.843 | 1.843 |

INDUSTRIAL APPLICABILITY

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

DESCRIPTION OF THE REFERENCE CHARACTERS

G1 first lens unit
G2 second lens unit
G3 third lens unit
G4 fourth lens unit
L1 first lens element
L2 second lens element
L3 third lens element
L4 fourth lens element
L5 fifth lens element
L6 sixth lens element
L7 seventh lens element
L8 eighth lens element
A aperture diaphragm
P plane parallel plate
S image surface
1 zoom lens system
2 image sensor
3 liquid crystal display monitor
4 body
5 main barrel
6 moving barrel
7 cylindrical cam

The invention claimed is:

1. A zoom lens system, in order from an object side to an image side, comprising a first lens unit having positive optical power, a second lens unit having negative optical power, a third lens unit having positive optical power, and a fourth lens unit having positive optical power, wherein
the first lens unit is composed of at most two lens elements,
the second lens unit is composed of two lens elements,
the third lens unit is composed of three lens elements, and
the following condition (1) is satisfied:

$$nd > 1.75 \quad (1)$$

where,
nd is a refractive index to the d-line of each lens element constituting the zoom lens system.

2. The zoom lens system as claimed in claim 1, wherein the second lens unit includes a lens element having positive optical power, and the following condition (5) is satisfied:

$$1.88 < nd_{2p} < 2.20 \quad (5)$$

where,
$nd_{2p}$ is a refractive index to the d-line of the lens element having positive optical power, which is included in the second lens unit.

3. The zoom lens system as claimed in claim 1, wherein the second lens unit includes a lens element having negative optical power, and the following condition (6) is satisfied:

$$0.35 < (r_{2na}+r_{2nb})/(r_{2na}-r_{2nb}) < 1.20 \qquad (6)$$

where,
$r_{2na}$ is a radius of curvature of an object side surface of the lens element having negative optical power, which is included in the second lens unit, and
$r_{2nb}$ is a radius of curvature of an image side surface of the lens element having negative optical power, which is included in the second lens unit.

4. The zoom lens system as claimed in claim 1, wherein the second lens unit is composed of two lens elements, in order from the object side to the image side, including a lens element having negative optical power, and a lens element having positive optical power, and the following condition (7) is satisfied:

$$-8.5 < (r_{2nb}+r_{2pa})/(r_{2nb}-r_{2pa}) < -3.5 \qquad (7)$$

where,
$r_{2nb}$ is a radius of curvature of an image side surface of the lens element having negative optical power, which is included in the second lens unit, and
$r_{2pa}$ is a radius of curvature of an object side surface of the lens element having positive optical power, which is included in the second lens unit.

5. The zoom lens system as claimed in claim 1, wherein the first lens unit includes a lens element having positive optical power, and the following condition (8) is satisfied:

$$-1.80 < (r_{1pa}+r_{1pb})/(r_{1pa}-r_{1pb}) < 0.00 \qquad (8)$$

where,
$r_{1pa}$ is a radius of curvature of an object side surface of the lens element having positive optical power, which is included in the first lens unit, and
$r_{1pb}$ is a radius of curvature of an image side surface of the lens element having positive optical power, which is included in the first lens unit.

6. The zoom lens system as claimed in claim 1, wherein the following condition (9) is satisfied:

$$1.87 < f_3/f_W < 3.00 \qquad (9)$$

in which, $$\omega_W \geq 30 \qquad (a\text{-}2)$$

$$f_T/f_W > 4.5 \qquad (b\text{-}2)$$

where,
$f_3$ is a composite focal length of the third lens unit,
$\omega_W$ is a half view angle (°) at a wide-angle limit,
$f_T$ is a focal length of the entire system at a telephoto limit, and
$f_W$ is a focal length of the entire system at a wide-angle limit.

7. The zoom lens system as claimed in claim 1, wherein the third lens unit is composed of three lens elements, in order from the object side to the image side, including an object side lens element having positive optical power, a lens element having negative optical power, and an image side lens element having positive optical power.

8. The zoom lens system as claimed in claim 7, wherein the following condition (10) is satisfied:

$$0.5 < f_{3IL}/f_3 < 1.5 \qquad (10)$$

in which, $$\omega_W \geq 30 \qquad (a\text{-}2)$$

$$f_T/f_W > 4.5 \qquad (b\text{-}2)$$

where,
$f_{3IL}$ is a focal length of the image side lens element having positive optical power, which is included in the third lens unit,
$f_3$ is a composite focal length of the third lens unit.
$\omega_W$ is a half view angle (°) at a wide-angle limit,
$f_T$ is a focal length of the entire system at a telephoto limit, and
$f_W$ is a focal length of the entire system at a wide-angle limit.

9. The zoom lens system as claimed in claim 7, wherein the following condition (11) is satisfied:

$$-1.00 < f_{3n}/f_3 < -0.25 \qquad (11)$$

in which, $$\omega_W \geq 30 \qquad (a\text{-}2)$$

$$f_T/f_W > 4.5 \qquad (b\text{-}2)$$

where,
$f_{3n}$ is a focal length of the lens element having negative optical power, which is included in the third lens unit,
$f_3$ is a composite focal length of the third lens unit.
$\omega_w$ is a half view angle (°) at a wide-angle limit,
$f_T$ is a focal length of the entire system at a telephoto limit, and
$f_W$ is a focal length of the entire system at a wide-angle limit.

10. The zoom lens system as claimed in claim 7, wherein, in the third lens unit, the object side lens element having positive optical power and the lens element having negative optical power are cemented with each other to constitute a cemented lens element.

11. The zoom lens system as claimed in claim 1, wherein the fourth lens unit comprises solely a lens element having positive optical power.

12. An imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system, in order from an object side to an image side, comprises a first lens unit having positive optical power, a second lens unit having negative optical power, a third lens unit having positive optical power, and a fourth lens unit having positive optical power, wherein
the first lens unit is composed of at most two lens elements,
the second lens unit is composed of two lens elements,
the third lens unit is composed of three lens elements, and
the following condition (1) is satisfied:

$$nd > 1.75 \qquad (1)$$

where,
nd is a refractive index to the d-line of each lens element constituting the zoom lens system.

13. A camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of at most two lens elements,
the second lens unit is composed of two lens elements,
the third lens unit is composed of three lens elements, and
the following condition (1) is satisfied:

$$nd > 1.75 \qquad (1)$$

where, nd is a refractive index to the d-line of each lens element constituting the zoom lens system.

\* \* \* \* \*